United States Patent
Finn et al.

(10) Patent No.: US 12,427,735 B1
(45) Date of Patent: *Sep. 30, 2025

(54) PLATING AND COATING OF RFID ENABLED METAL TRANSACTION CARDS WITH MECHANICALLY ENGRAVED AND LASER ETCHED FEATURES

(71) Applicant: Metaland LLC, Doral, FL (US)

(72) Inventors: David Finn, Fussen Weissensee (DE); Darren Molloy, Killour (IE); Daniel Pierrard, Killour (IE)

(73) Assignee: Metaland LLC, Doral, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/157,841

(22) Filed: Jan. 22, 2023

Related U.S. Application Data

(63) Continuation-in-part of application No. 17/952,253, filed on Sep. 24, 2022, which is a continuation-in-part of application No. 17/903,886, filed on Sep. 6, 2022, which is a continuation-in-part of application No. 17/882,569, filed on Aug. 7, 2022, and a continuation-in-part of application No. 17/882,568, filed on Aug. 7, 2022, and a continuation-in-part of application No. 17/866,547, filed on Jul. 17, 2022, (Continued)

(51) Int. Cl.
*G06K 19/00* (2006.01)
*B29D 7/00* (2006.01)

(52) U.S. Cl.
CPC ...................... *B29D 7/00* (2013.01)

(58) Field of Classification Search
CPC ......... G06K 19/07749; G06K 19/0723; G06K 19/077; G06K 19/07; G06K 19/07722; G06K 19/07758; G06Q 20/357; G06Q 20/3278; G06F 3/044
USPC .............. 235/487, 492, 486, 462.46, 472.02
See application file for complete search history.

(56) References Cited

U.S. PATENT DOCUMENTS 9,475,086 B2 * 10/2016 Finn ...................... B23K 26/361
9,836,684 B2 * 12/2017 Finn .................. G06K 19/07722
(Continued)

FOREIGN PATENT DOCUMENTS

CN         111684466        *  9/2020  ........... G06K 19/077

OTHER PUBLICATIONS

Foreign Patent.*

*Primary Examiner* — Daniel St Cyr
(74) *Attorney, Agent, or Firm* — Michael D. Eisenberg; MDE Patents

(57) ABSTRACT

Encapsulating the rear side of a top metal layer of a metal transaction card with a thermosetting resin, applying a primer to the front side of the top metal layer and drying in an oven before spraying a thermoset powder coating thereon, laser etching and mechanically engraving graphic elements into the powder coating to reveal the bare metal surface, inkjet printing graphic features to the powder coat. Encapsulating the rear side of a bottom metal layer of the card with a thermosetting resin, applying a primer to the rear side of the bottom metal layer and drying in an oven before digitally printing artwork, applying a protective overlay layer with magnetic stripe to the printed graphics, applying a primer or an adhesive film to the thermosetting to enable lamination of the top metal layer to the bottom metal layer.

13 Claims, 9 Drawing Sheets

Related U.S. Application Data now Pat. No. 11,948,036, and a continuation-in-part of application No. 17/857,912, filed on Jul. 5, 2022, and a continuation-in-part of application No. 17/839,521, filed on Jun. 14, 2022.

(60) Provisional application No. 63/417,681, filed on Oct. 19, 2022, provisional application No. 63/349,106, filed on Jun. 5, 2022, provisional application No. 63/345,430, filed on May 25, 2022, provisional application No. 63/334,671, filed on Apr. 26, 2022, provisional application No. 63/302,027, filed on Jan. 22, 2022, provisional application No. 63/283,561, filed on Nov. 29, 2021, provisional application No. 63/241,005, filed on Sep. 6, 2021.

(56) References Cited

U.S. PATENT DOCUMENTS

| | | | |
|---|---|---|---|
| 11,983,591 B2 * | 5/2024 | Michieli | B42D 25/47 |
| 2004/0099746 A1 * | 5/2004 | Norton | G06K 19/0728 |
| | | | 235/492 |
| 2013/0126622 A1 * | 5/2013 | Finn | H05K 3/103 |
| | | | 29/601 |
| 2015/0180229 A1 * | 6/2015 | Herslow | G06K 19/07749 |
| | | | 156/60 |
| 2017/0267013 A1 * | 9/2017 | Staub | B42D 25/29 |
| 2018/0339503 A1 * | 11/2018 | Finn | H01Q 1/2225 |
| 2021/0049431 A1 * | 2/2021 | Finn | G06K 19/0723 |

* cited by examiner

PLATING AND COATING OF RFID ENABLED METAL TRANSACTION CARDS WITH MECHANICALLY ENGRAVED AND LASER ETCHED FEATURES

CROSS-REFERENCES TO RELATED APPLICATIONS

This application is:
a non-provisional of Ser. No. 63,417,681 filed 19 Oct. 2022
a non-provisional of Ser. No. 63,302,027 filed 22 Jan. 2022
a continuation-in-part of Ser. No. 17,952,253 filed 24 Sep. 2022
a continuation-in-part of Ser. No. 17,903,886 filed 6 Sep. 2022
    Ser. No. 17,903,886 is a non-provisional of Ser. No. 63,241,005 filed 6 Sep. 2021
a continuation-in-part of Ser. No. 17,882,569 filed 7 Aug. 2022
    Ser. No. 17,882,569 is a non-provisional of Ser. No. 63,349,106 filed 5 Jun. 2022
    Ser. No. 17,882,569 is a non-provisional of Ser. No. 63,345,430 filed 25 May 2022
    Ser. No. 17,882,569 is a non-provisional of Ser. No. 63,334,671 filed 26 Apr. 2022
    Ser. No. 17,882,569 is a non-provisional of Ser. No. 63,241,005 filed 6 Sep. 2021
a continuation-in-part of Ser. No. 17,882,568 filed 7 Aug. 2022
    Ser. No. 17,882,568 is a non-provisional of Ser. No. 63,349,106 filed 5 Jun. 2022
    Ser. No. 17,882,568 is a non-provisional of Ser. No. 63,345,430 filed 25 May 2022
    Ser. No. 17,882,568 is a non-provisional of Ser. No. 63,334,671 filed 26 Apr. 2022
    Ser. No. 17,882,568 is a non-provisional of Ser. No. 63,241,005 filed 6 Sep. 2021
a continuation-in-part of Ser. No. 17,866,547 filed 17 Jul. 2022
a continuation-in-part of Ser. No. 17,857,912 filed 5 Jul. 2022
a continuation-in-part of Ser. No. 17,839,521 filed 14 Jun. 2022
a non-provisional of Ser. No. 63,349,106 filed 5 Jun. 2022
a non-provisional of Ser. No. 63,345,430 filed 25 May 2022
a non-provisional of Ser. No. 63,334,671 filed 26 Apr. 2022

FIELD OF THE INVENTION

This invention relates to the field of metal transaction cards (smartcards) and, more particularly, passive RFID-enabled metal transaction cards having at least one metal layer and operating at least in contactless mode from one or both (front and rear) sides of the card.

Some of the disclosure(s) herein may relate to RFID-enabled metal transaction cards having a contactless interface only.

Some of the disclosure(s) herein may relate to metal transaction cards having a fingerprint sensor, a dynamic display or an organic light emitting diode.

Some of the disclosure(s) herein may relate to transaction cards made from a material other than metal.

BACKGROUND

Consumers have demonstrated a demand for metal transaction cards (debit and credit) because of their durability, prestigiousness, aesthetics and overall luxury feel compared to conventional plastic cards.

Most dual interface (contact and contactless) metal cards have a single chip module comprising of an integrated circuit (RFID payment chip) connected to contact pads (on its face-up side) visible and accessible from the exterior of the metal card body and also connected to a module antenna (on its face-down side) for transmission and reception of data in contactless mode by means of inductive coupling with an in-card booster antenna circuit (adhesively attached to its companion magnetic shielding layer) or with a slit and opening in a metal layer of the card body functioning as a coupling frame (which obviates the need for a booster antenna circuit and magnetic shielding) to facilitate the sending and receiving of signals from an electromagnetic field generated by a point of sale (POS) terminal. The booster antenna circuit on a magnetic shielding layer or a filled slit and opening in a metal layer typically alters the structural rigidity of the card body and/or detracts from the overall "metallic" behavior of the card, such as the drop acoustics produced when a metal card is tossed on a hard surface. This metallic sound is a highly desirable feature to many of those who make regular metal card payments. However, producing a metal transaction card with dual interface functionality, while maintaining the structural rigidity and desired "metallic" sound, presents an engineering challenge.

Users, producers, and issuing banks of metal transaction cards may have an interest in implanting electronic components and devices into a metal card body to enhance the functionality. Such embedded electronics may include, without limitation, a touch switch, a fingerprint sensor, a dynamic display or an organic light emitting diode. Integrating circuitry and inductive coupling elements in the metal card body to enable communication between the contact and contactless chip module incorporating an RFID payment chip and the embedded electronic device also poses an engineering challenge. Compounding the problem is the requirement that the dual interface metal transaction card has a highly sophisticated appearance.

Metal transaction cards may have any number of distinguishing features to differentiate one card offering from another, such as the mechanical engraving or laser etching of logos and three dimensional designs into a highly polished metal surface on the front face of a metal transaction card. Such machined surfaces with intricate design features may be further plated with gold or platinum to enhance the perceived value of the card. However, it is desirable that the metal transaction card has a certain weight (determined by the thickness of the metal layer or layers) coupled with aesthetic design, while at the same time integrating contactless functionality which further poses an engineering challenge.

Some Patents and Publications of Interest

The following patents and/or publications ("references") may be of interest or relevant to the invention(s) disclosed herein, and some commentary may be provided to distinguish the invention(s) disclosed herein from the following references.

US 2013/0126622 (23 May 2013; David Finn; Finn), entitled "Offsetting Shielding and Enhancing Coupling in Metallized Smart cards", incorporated by reference herein, discloses a method of offsetting shielding and enhancing coupling in metallized smart cards. A dual-interface smart card having a booster antenna with coupler coil in its card body, and a metallized face plate having a window opening for the antenna module. Performance may be improved by one or more of making the window opening substantially larger than the antenna module, providing perforations through the face plate, disposing ferrite material between the face plate and the booster antenna. Additionally, by one or more of modifying contact pads on the antenna module, disposing a compensating loop under the booster antenna, offsetting the antenna module with respect to the coupler coil, arranging the booster antenna as a quasi-dipole, providing the module antenna with capacitive stubs, and disposing a ferrite element in the antenna module between the module antenna and the contact pads.

Teachings of US 2013/0126622—PVC Plug in Opening

An interim product may comprise the ferrite 204, adhered with adhesive 205 to the underlying spacer layer 208, and the card body layer 210 with the booster antenna 212 inlaid therein. This interim product may be referred to as a pre-laminated stack, or "prelaminate", and may have a thickness of approximately 450 μm.

The prelaminate may be delivered to a second manufacturer who will apply the faceplate 202, the bottom PVC sheet 214 and the bottom overlay 216. The faceplate 202 may be pre-punched (or otherwise machined) with the opening 220. The resulting stack-up may have a pre-laminated thickness of approximately 940 μm (0.94 mm), and after lamination (heat and pressure) have a final thickness of approximately 890 μm (0.89 mm).

In the lamination process, a plug of material may first be inserted into the window opening 220 to prevent the underlying material (ferrite 204, spacer PVC 208, card body PVC 210, etc.) from expanding upwards into the window opening 220 (and causing a resulting indent on the bottom surface of the smart card). The material for the plug may be PVC, or the metal "slug" which was removed from the faceplate to make the opening, or the like.

Typically, after lamination, the plug (if metal) is removed. If the plug was PVC, it may be left in place. The recess for the antenna module may then be machined into the layers (ferrite 204, spacer PVC 208, card body PVC 210) of the smart card, being careful (of course) not to damage the coupler coil (CC).

A window opening 220 ("W") may extend into the smart card from the face plate 202, through intervening layers, into the card body layer 210. A dual interface (DI) antenna module (AM), with module antenna (MA) may be disposed in the window opening 220. Compare FIG. 1 The window opening 220 may extend completely through the layer 210, in which case the antenna module (AM) would be supported by the underlying layer 214.

Teachings of US 2013/0126622—Gap Between Chip Module and Metal

According to an embodiment of the invention, a smart card having a metallized face plate with a window opening for accepting an antenna module, and a card body with a booster antenna including a coupler coil, wherein the window opening has a baseline size approximately equal to a size of the antenna module, may be characterized in that the window opening is substantially larger than the antenna module. The window opening may be at least 10% larger than the antenna module, resulting in a gap between inner edges of the window opening and the antenna module. A ferrite layer may be disposed between the face plate and the booster antenna. A plurality of perforations may be formed in the face plate extending around at least one of the window opening and the periphery of the face plate. At least some of these perforations may reduce the amount of faceplate material in an area surrounding the window opening or around the periphery of the face plate by 25-50%. A compensation loop may be disposed behind the booster antenna. The compensation loop may have a gap, and two free ends, may comprise a conductive material such as copper, and may comprise ferrite.

U.S. Pat. No. 9,836,684 (5 Dec. 2017; Finn et al.), entitled "Smart Cards, Payment Objects and Methods", incorporated by reference herein, discloses smartcards having (i) a metal card body (MCB) with a slit (S) overlapping a module antenna (MA) of a chip module (TCM) or (ii) multiple metal layers (M1, M2, M3) each having a slit (S1, S2, S3) offset or oriented differently than each other. A front metal layer may be continuous (no slit), and may be shielded from underlying metal layers by a shielding layer (SL). Metal backing inserts (MBI) reinforcing the slit(s) may also have a slit (S2) overlapping the module antenna. Diamond like coating filling the slit. Key fobs similarly fabricated. Plastic-Metal-Plastic smart cards and methods of manufacture are disclosed. Such cards may be contactless only, contact only, or may be dual-interface (contact and contactless) cards.

Shielded Laminated Smartcard

FIG. 16B of U.S. Pat. No. 9,836,684 shows a shielded, laminated metal laminated shielded card (SC) 1600B having two coupling frame metal layers and a front face (MHL1) which is a continuous metal layer (no slit). Some of the metal layers are the same (or similar) to those shown in the construction of FIG. 16A. Notably different, however, is that the top metal layer (ML1) does not have a slit (there is no "S1" in this embodiment). The second metal layer (MHL2) has a slit (S2), and the third metal layer (ML3) has a slit (S3), as in the construction of FIG. 16A, and the various layers may be held together (laminated) with layers of adhesive, as shown. The dimensions of the various layers may be similar to those in the construction of FIG. 16A.

The front face (ML1) 1620A, as shown, does not have a slit, and may interact with the reader electromagnetic field and produce induced eddy currents within its body. These eddy currents will normally produce a counter-field resulting in reduction or blocking of the communication between the transponder chip module and reader. To offset this, a shielding layer (SL) 1640 of suitably chosen magnetic material may be placed between the front continuous metal layer and the coupling frame layers (ML2, ML3) of the card. A layer of adhesive 1622 having a thickness of 20 μm may be disposed between the front metal layer ML1 and the shielding layer SL. A layer of adhesive 1623 having a thickness of 20 μm may be disposed between the shielding layer SL and the second metal layer ML2.

The front metal layer (ML1) may have a thickness of 200 μm, rather than 300 μm (or 320 μm) as in the construction of FIG. 16A. The shielding layer (SL) may have a thickness of approximately 50-200 μm, such as 100 μm (which was gained by making the front layer thinner than in the construction of FIG. 16A). In this manner the coupling frames will be shielded from the attenuating front metal layer and continue to function in conjunction with the transponder chip module (TCM).

Other elements of the FIG. 16B embodiment, such as the second metal layer ML2 and third metal layer ML3 may be substantially similar or identical to corresponding (similarly numbered) elements in the embodiment of FIG. 16A. Generally, the top metal layer ML1 of FIG. 16A is replaced by a metal layer ML1 without a slit and a shielding layer SL. The module antenna (MA) of the transponder chip module (TCM) may reside in a plane that lies below the continuous front metal layer (ML1). The module antenna (MA) may be surrounded on all edges (sides) by magnetic shielding material (not shown) to reduce the attenuation from eddy currents in the front metal layer (ML1). In this manner the performance of the magnetic shielding material may be maximized and the coupling of the transponder chip module (TCM) with the coupling frame layers (MHL2, ML3) may be improved.

U.S. Pat. No. 9,390,366 (12 Jul. 2016; CompoSecure; Herslow et al.), entitled "Metal smart card with dual interface capability", incorporated by reference herein, discloses a dual interface smart card having a metal layer includes an IC module, with contacts and RF capability, mounted on a plug, formed of non-RF impeding material, between the top and bottom surfaces of the metal layer. The plug provides support for the IC module and a degree of electrical insulation and isolation from the metal layer. The resultant card can have contact and contactless operating capability and an entirely smooth external metal surface except for the contacts of the IC module.

Claim 1 of U.S. Pat. No. 9,390,366

A metal smart card with dual interface capability comprising: a metal layer of thickness D having a top surface and a bottom surface extending parallel to each other; an integrated circuit (IC) module having a top region with contacts enabling the IC module to make physical contact to a card reader and said IC module also including means for radio frequency (RF) communication with a card reader; said IC module having a length L1, a width W1 and a thickness of D1, which is less than D; a plug of non RF impeding material having lateral dimensions of L2, equal to or greater than L1, and W2 equal to or greater than W1; an opening in said metal layer extending for the full thickness of said metal layer in which is securely located said IC module mounted on said plug, said IC module and said plug extending in the vertical direction between the top and bottom surfaces of the metal layer, with the contacts of the IC module being positioned along the same horizontal plane as the top surface of the metal layer.

U.S. Pat. No. 9,881,247 (30 Jan. 2018; IDEMIA; Le Garrec et al.), entitled "Method for producing a smart card having a plurality of components and card obtained in this way", incorporated by reference herein, discloses a method is provided for producing a smart card including at least one chip and another electronic component having a face accessible from the outside. The method includes: forming a card body having two opposing faces and in which at least two recesses are formed, one being a through-recess extending from one of the faces to the other, forming a first module including the chip and forming a second module separate from the first module and including the other electronic component, the second module including a support to which the component is secured opposite the face that must be accessible, securing the second module in the through-recess from the face of the body that is opposite the face through which the face of the component must be accessible, via a shoulder in the through-recess, and securing the first module in the other recess.

U.S. Pat. No. 10,534,990 (14 Jan. 2020; CompoSecure; Herslow et al.), entitled "Metal smart card with dual interface capability", incorporated by reference herein, discloses a dual interface smart card, and methods for the manufacture thereof, having a metal layer, an IC module, with contacts and RF capability, and a plug formed of non RF impeding material, disposed in the metal layer. The plug provides support for the IC module and a degree of electrical insulation and isolation from the metal layer. Embodiments of the card include at least one additional layer.

Claim 1 of U.S. Pat. No. 10,534,990

A smart card comprising: a metal layer having a thickness (D) and first and second opposite surfaces; an opening in said metal layer extending for the thickness (D) of said metal layer; a plug of non-RF-impeding material and a dual interface integrated circuit (IC) module mounted in said opening, the IC module having contacts configured for physical contact with a card reader, wherein the plug has a perimeter larger than a perimeter of the IC module; and at least one additional layer stacked relative to the plug.

US 2021/0232887 (29 Jul. 2021; Ritter), entitled "Method of filling a slit in a metallic smartcard", incorporated by reference herein, discloses a method for filling a through slit in a metal layer for use in a metallic smartcard by providing a metal sheet having at least one through slit extending through the thickness of the metal sheet, applying a polymer resin to the metal sheet so as to substantially fill the slit(s), and curing the resin. A coupling frame for a smartcard, and a smartcard are also provided.

US 2022/0253661 (11 Aug. 2022; Credit Card Supplies; Daley et al.), entitled "Method for Manufacturing Electronic Transaction Cards", incorporated by reference herein, discloses a method of providing a contactless card having a metal substrate with a first and second, a top and bottom face. A slit can be created in the creating a slit in the metal substrate wherein the slit has ends extending to the edges of the substrate. The method includes filling the slit with a central fill filler material wherein the central fill defines a top void between the central fill and a top plane relative to a top face of the substrate and the central fill defines a bottom void between the central fill and a bottom plane relative to a bottom face of the substrate. The filler material of the central, top, and bottom portions is cured and planned to be flush with the substrate front and back surfaces. The filler material can be a resin and the slit can have generally an "S" configuration or portion thereof.

U.S. Ser. No. 17/839,521, entitled "RFID Enabled Metal Transaction Cards", incorporated by reference herein, discloses a metal transaction card comprising a front face continuous metal layer and a rear continuous metal layer sandwiching electronic component elements adhesively attached to each other using a thermosetting adhesive coating (epoxy or polyurethane) or a thermosetting adhesive film layer (epoxy or polyurethane). The thermosetting adhesive coating or film (epoxy or polyurethane) may be applied in B-stage, and converted to C-stage after a lamination process involving selected temperature and pressure profiles over a specific cycle time.

U.S. Ser. No. 17/857,912, entitled "Contactless Metal Cards With Fingerprint Sensor", incorporated by reference herein, discloses a biometric transaction card with a metal chassis wherein a first continuous or discontinuous metal layer is coated on one side with a chemical bonding agent (primer) followed by a coating of thermosetting resin of a defined thickness filling any opening, void, recess or slit in the first metal layer, and a second continuous or discontinuous metal layer is also coated on one side with a chemical bonding agent (primer) followed by a coating of thermosetting resin of a defined thickness filling any opening, void, recess or slit in the second metal layer, wherein both resin coated metal layers are joined together using a thermosetting adhesive film layer placed between the cured thermosetting resin layers in a hot press lamination process. The thermosetting adhesive film layer may be replaced by a coating of primer to one or both resin coated metal layers.

A dual interface chip module and or a fingerprint touch sensor (or components) may be implanted in milled-out pockets in the thermosetting resin. Removed metal sections may also be encased in (by) the thermosetting resin.

A rear side of the front continuous metal layer may be surface treated and coated with an adhesion promoter to enhance the adhesion of the thermosetting resin to the metal. The surface may be chemically etched, or sand blasted resulting in a "scuffed-up" surface. The metal surface may undergo chemical treatment as a metal finishing process. The adhesion promoter may be a thermosetting adhesive coating, a thermosetting adhesive film layer or a primer (chemical bonding agent) acting as an interface. After the deposition of the adhesive promoter, the thermosetting resin may be applied, seeping into any opening, aperture, void, cavity or recess, and encapsulating the entire area to a defined thickness.

U.S. Ser. No. 17,866,547, entitled "RFID Enabled Metal Transaction Cards", incorporated by reference herein, discloses a method for producing a metal transaction card having a front face metal layer (continuous) and a rear metal layer (discontinuous) sandwiching a magnetic shielding layer assembled to a booster antenna circuit for contactless communication separated by a resin spacing layer, wherein the metal layers and magnetic shielding layer are coated with a thermosetting resin (e.g., epoxy or polyurethane) by means of a roll coating process or any suitable over-molding process such as casting, and wherein a layer of thermosetting resin is applied to the primed surface of a metal layer with an array of card body sites forming a metal inlay having a resin thickness which can be mechanically reduced after final curing; the roll coating process also fills any pockets, channels or recesses in the metal layer with thermosetting resin; the roll coating process in addition fills any voids or holes in the magnetic shielding layer, the PET carrier layer for the booster antenna circuit and any subsequent synthetic or adhesive layers in the stack-up construction; the roll coating process further fills any openings or slits in the intermediate discontinuous metal layer covered by a sacrificial layer on one side. Optionally, thermosetting resin can be dispensed into any pocket, channel or recess in any of the layers forming a metal card body.

The metal transaction card may comprise a front face continuous or discontinuous metal layer and may have a layer of polyurethane (PU) resin upon which graphic elements may be digitally (inkjet) printed (primer and ink) thereon. The polyurethane resin may be further doped to facilitate laser engraving or marking of its polymer surface for the purpose of personalization. Prior to the application of the polyurethane resin, the metal layer may be surface treated and primed. The polyurethane resin may be a two-component, low viscosity, semi-flexible PU compound with the physical properties (mix ratio (w/w): polyol/isocyanate, viscosity (mPa*s, or millipascal seconds), density ($g/cm^3$), pot life (min), gel-time (min), curing time (hr) and final cure (days)) determining the adhesion, hardness and tensile strength of the compound.

U.S. Ser. No. 17,882,568, entitled "RFID Enabled Metal Transaction Cards", incorporated by reference herein, discloses a metal transaction card having a front face "continuous" (no slit) or "discontinuous" (with slit) metal layer having a module opening for accepting a dual interface chip module. Coating thermosetting resin (e.g., epoxy or polyurethane) may be used to replace (in lieu of) conventional thermosetting adhesive film layers and plastic slugs or plugs, and to fill module openings, apertures, voids and recesses in layers of the card body. A booster antenna circuit, comprising of a perimeter coil, coupler coil and a capacitor bank on a polyethylene terephthalate (PET) carrier layer, disposed behind the magnetic shielding, may be encapsulated in a thermosetting resin. The magnetic shielding layer and the PET carrier layer may have voids to allow for inductive coupling. The thermosetting resin may further fill and seal the module opening in the front face continuous metal layer and any apertures, voids or recesses in subsequent layers. The resin may fill and seal any discontinuity (in the form of a slit) or opening in a rear discontinuous metal layer. The dual interface chip module may be implanted in a milled-out cavity in the thermosetting resin. Flexible glass may be laminated to a resin coated discontinuous metal layer or the flexible glass may be submerged in a layer of thermosetting resin to enhance the mechanical strength of the glass assembled on the front face metal layer.

For the purpose of clarity, a layer of thermosetting resin may be used in combination with a film layer of thermosetting adhesive. A thermosetting adhesive film layer may be used as an adhesion promoter to bond thermosetting resin to a layer of metal or may be used as a bonding interface between a cured thermosetting resin layer and a synthetic print layer. An adhesion promoter in the form of a primer (chemical bonding agent) and or a thermosetting adhesive coating may be used to laminate a cured thermosetting resin layer to a synthetic printed layer of PVC with graphic artwork.

A method of manufacturing a metal transaction card having a front face metal layer with a module opening to accept the implanting of a dual interface chip module and additional layers of thermosetting adhesive film and synthetic material may comprise: applying an adhesion promoter comprising a primer layer to a rear surface of the front face metal layer; and allowing the primer layer to dry; wherein the adhesion promoter further comprises an adhesive top-coat; further comprising: applying the adhesive top-coat onto the dried primer layer; and coating the top-coat with thermosetting resin. The thermosetting resin may be applied by a process of roll coating or slot nozzle coating. At least some of the layers may have openings, apertures, voids, or cavities; and the thermosetting resin may seep into the openings, apertures, voids, or cavities. The thermosetting resin may encapsulate an entire area of the transaction card to which it is applied to a defined thickness.

The adhesion promoter may comprise a chemical bonding agent (primer) acting as an interface, or a two-coat adhesive formulation. The adhesion promoter may be deposited by spraying, dipping, rod coating or screen printing. The thermosetting resin, when cured, may contribute to the smart-card exhibiting a metallic sound when tossed on a hard surface.

After the thermosetting resin is fully cured, at least one of the following steps may be performed: back-lapping the cured thermosetting resin to reduce its thickness; laser etching or mechanically engraving the cured thermosetting resin; and printing on the cured thermosetting resin. The cured thermosetting resin may be receptive to ink.

The thermosetting resin may be filled with glass fiber for increased strength. The thermosetting resin may be colored with a pigment.

Prior to applying the primer layer, a surface treatment may be performed on the rear surface of the front metal layer to produce a scuffed-up surface. The surface treatment may comprise chemically etching or sand blasting the rear surface of the front metal layer.

In filling and sealing any openings, apertures, voids or cavities in any metal layer or any subsequent layer in the card construction, the front face and rear face surfaces of the metal card body are devoid of any indents or dimples. Synthetic printed layers assembled to a metal layer may not reveal any deformations at the position of the openings, apertures, voids or cavities post lamination.

U.S. Ser. No. 17,882,569, entitled "Coating and Filling Openings in a Metal Inlay And Method for Making a Metal Transaction Card", incorporated by reference herein, discloses a method of covering an opening, an aperture, a void or a slit at each site in an array of card body positions in a layer of metal forming a metal inlay (typically in a 16- or 25-up format), using a sacrificial layer to create a pocket, cavity, recess or channel. The pockets, cavities, recesses or channels created by the presence of the sacrificial layer on one side (front side) of the layer of metal may be further sealed using a non-conductive polymeric material such as a thermosetting resin (e.g., epoxy or polyurethane). The thermosetting resin may be transparent or pigmented. The side (front side) of the layer of metal disposed with the sacrificial layer is further protected from surface scratches which may occur from general handling, conveying and production processing.

A thermosetting adhesive film layer on a release liner may be applied to the same side of the layer of metal in which the thermosetting resin is applied (rear side). The thermosetting adhesive film layer on a release liner may have cut-outs matching approximately the dimensional and geometrical positions of the pocket, cavity, recess or channel (in the x and y axis) at each card body site. The thermosetting adhesive film layer in B-stage may be bonded to the layer of metal (rear side) by application of heat and pressure over time to convert to C-stage.

The thermosetting resin (e.g., epoxy or polyurethane) may be roll coated to the cured thermosetting adhesive film layer to a defined thickness, encapsulating or encasing the entire side of the layer of metal with the thermosetting resin (rear side), and simultaneously filling and sealing the pockets, cavities, recesses or channels. The encapsulation layer may be further compressed with a pressure plate to remove gases. The cured thermosetting resin may facilitate the retention of the drop acoustics of the layer of metal in a final laminated metal card body.

The fully cured thermosetting resin in a hardened state may be machined (back-lapped) to reduce the overall thickness on the side of the layer of metal (rear side) encapsulated by the resin.

The sacrificial layer may comprise a protective release film with low tack adhesive such as polyethylene film tape or plasticized PVC film. The sacrificial layer may be polytetrafluoroethylene (PTFE, Teflon®).

After removal of the sacrificial layer from the layer of metal (front side), an unscratched metal surface is revealed with openings (module openings) sealed with fully cured thermosetting resin.

The fully cured thermosetting resin in each (module) opening at each card body site in the array may be CNC milled to create a stepped recess for later embedding of a chip module.

The front side of the layer of metal may be roll coated with a transparent thermosetting resin by first applying an adhesion promoter in the form of a primer (chemical bonding agent) and or a thermosetting adhesive coating, shrouding the entire front side with resin.

U.S. Ser. No. 17,882,569 also discloses a metal inlay comprising a layer of metal defining a plurality of card body sites (typically an array of 16 or 25 card body positions) on the layer of metal, each card body site corresponding to a single metal card body, performing a laser or water cutting operation to form corner struts extending from corners of the card body sites to the metal inlay, with void sections extending around sides of the card body sites except for where the card body site is supported by the corner struts of the metal inlay and filling the void sections with thermosetting resin. In addition, forming a module opening at each card body site and filling the openings with the thermosetting resin. In a further production step, synthetic layers (e.g., sheets of adhesive film, PVC with printed artwork and protective overlay material) are laminated to the encapsulated metal inlay, followed by singulation of the card body sites by removing the struts through cutting or punching.

U.S. Ser. No. 17,882,569 further discloses that by using a masking frame of a given thickness around or on a metal substrate, the polyurethane resin during roll coating may be cast within the opening of the masking frame. An alternative coating process to roll coating may be slot die applicator technology.

FIG. 4 of U.S. Ser. No. 17,882,569 shows a discontinuous metal layer (ML, DML) having an opening (MO) and a slit (S), and a release film layer (RL: also referred to as a sacrificial layer) ready for attachment to the underside side of the discontinuous metal layer to protect the surface of the metal from scratches and to cover the opening and slit to form a pocket and a channel, with the assembly kept in position on a level bed under vacuum, and a nozzle or extruder delivering a filler such as a thermosetting resin (polymeric material of epoxy or polyurethane) with fillers into the pocket and channel through the additive manufacturing process of deposition, printing, spraying or extruding.

U.S. Ser. No. 17,903,886 entitled "Encapsulating a Metal Inlay with Thermosetting Resin and Method for Making a Metal Transaction Card", discloses molding or casting thermosetting resin may be used to replace thermosetting adhesive film layers, plastic slugs or plugs and to fill module openings, cut-outs, gaps and voids in a metal transaction card. The use of thermosetting resin may also enhance or preserve (safeguard) the drop acoustics of the metal card. The method of coating thermosetting resin to a layer of metal may be substituted by the manufacturing techniques of casting, molding or reaction injection molding.

As disclosed therein: generally, metal layers of a smartcard have module openings ($P_1$ and $P_2$) for receiving a transponder chip module (TCM). Thermosetting resin coats (encapsulates) the top or bottom surface of the metal layers and fills the module openings. An inter-coat may be disposed between the thermosetting resin and the top or bottom surface of the metal layers. A metal layer may be a discontinuous metal layer (DML) having a slit which may also be filled by the thermosetting resin.

As used herein, the term "encapsulating" (and variations thereof) refers to coating (e.g., a metal layer or metal inlay) on at least one side or surface thereof and may include filling openings and slits in the metal layer.

A booster antenna circuit may be disposed between a continuous metal layer and a discontinuous metal layer; and a magnetic shielding layer may be disposed between the continuous metal layer and the booster antenna circuit. Adhesive may be disposed on both sides of the booster antenna circuit. Thermosetting resin may separate the booster antenna circuit at a given distance from the magnetic shielding layer to achieve optimum shielding and RF functionality. The distance may be at least 50 μm.

An adhesive layer may be disposed between a first resin coated (encapsulated) metal layer and a second resin coated (encapsulated) metal layer.

A method of making a smartcard may comprise: providing a metal layer having a top surface, a bottom surface, and a module opening extending between the top and bottom surfaces for receiving a transponder chip module; attaching a sacrificial layer to the top surface of the metal layer; and encapsulating (such as coating) the metal layer with a thermosetting resin disposed on the bottom surface of the first metal layer and filling the module opening of the first metal layer up to the sacrificial layer. The process of encapsulating may be selected from the group consisting of coating, open cast molding, vacuum or pressure casting, over-molding, compression molding, reaction injection molding (RIM) and reaction assisted molding process.

A surface treatment may be performed on the metal layer prior to coating (encapsulating) it. The surface treatment may be selected from the group consisting of mechanical surface preparation, chemical preparation, sanding, cleaning, ultrasonic cleaning, and dichromate treatment. The sacrificial layer may comprise polytetrafluoroethylene (PTFE, Teflon®) or polyolefin backing film. The sacrificial layer may be removed after the thermosetting resin is sufficiently cured to remain in the module opening. Before coating (encapsulating) the metal layer, an inter-coat may be applied to the bottom surface of the metal layer to promote adhesion of the thermosetting resin and the metal layer. The thermosetting resin may be transparent or pigmented. Printed stock may be laminated with elevated pressure and temperature to one or both of the top and bottom surfaces of the coated (encapsulated) metal layers.

U.S. Ser. No. 17,952,253 entitled "Encapsulating a Metal Inlay with Thermosetting Resin and Method for Making a Metal Transaction Card", a method of making a smartcard may comprise: providing a metal layer (ML) having a module opening (MO) extending from a front surface of the metal layer to a rear surface thereof, providing a sacrificial layer (SL) on the front surface of the metal layer; filling (from behind) the module opening with thermosetting resin (TR); allowing the thermosetting resin to cure (harden); removing the sacrificial layer; and from the front surface of the metal layer, milling a cavity in the cured (hardened) thermosetting resin for receiving a transponder chip module (TCM). A chip module may be implanted in the milled-out cavity, wherein the thermosetting resin provides mechanical support to the chip module and electrical insulation of the chip module from the metal layer. The smartcard may be "dual-interface".

A smartcard (SC) may comprise: a front discontinuous metal layer (ML, FML, DML) having a slit (S); a rear discontinuous metal layer (ML, RML, DML); and a transponder chip module (TCM) having a module antenna (MA); wherein the module antenna does not overlap the slit in the front metal layer; and wherein the module antenna overlaps the slit in the rear metal layer.

A dual-Interface metal face smartcard (SC) having a card body (CB) may comprise: a front continuous metal layer (ML, CML, FML); a magnetic shielding layer (MSL); a booster antenna circuit (BAC) enabling contactless functionality from a rear side of the card body; and a layer of thermosetting resin encapsulating the booster antenna circuit and magnetic shielding layer. The front continuous metal layer may have a module opening (MO) for receiving a transponder chip module (TCM). Thermosetting resin may fill the module opening and providing mechanical support for a transponder chip module (TCM) implanted in the thermosetting resin.

The typical uncured properties of the base resins (component A [polyol] and component B [poly-isocyanate]) may have a respective viscosity (mPa*s) at 25° C. of 150-350 (A) and 600-800 (B). The density of the resins at 25° C. for component A may be 1.05 g/cm$^3$ and for component B 1.20 g/cm$^3$. The mix ratio of the components (A:B) before casting may be by weight 100:86 or by volume 100:100. The mix viscosity at 25° C. may be 300-500 mPa*s. The gel-time in the casting mold at 25° C. may be 30-45 minutes. The curing time at 25° C. may be 24 hours. The final cured properties would be attained after 7 days, reaching a minimum hardness of 80 Shore A and transparent in color.

In summary, a continuous metal layer (CML) or a discontinuous metal layer (DML) with an array of card body sites having a laser cut module opening and optionally a slit and void sections at each card body site may be encapsulated on one surface side or on both surface sides with a thermosetting resin such as polyurethane, to cover the metal surface and fill any aperture, gap, recess or void in the metal layer with resin. The process of encapsulating the metal surface with a thermosetting resin may be selected from the group consisting of coating, open cast molding, vacuum/pressure casting, compression molding, reaction injection molding (RIM) and reaction assisted molding process (RAMP).

In the processes of coating, open cast molding, vacuum/pressure casting and compression molding the following steps may apply: (i) surface treating the metal layer after laser-cutting by means of ultrasonic cleaning and dichromate treatment; (ii) applying an adhesion promoter in the form of a primer (chemical bonding agent) to one side of the metal layer in a single coating step or in multiple coating steps, whereby the adhesion promoter may be applied by spraying, dipping, rod coating or screen printing; (iii) drying the metal layer coated with primer in an oven; (iv) applying a sacrificial layer to cover the other side of the metal layer (the side without primer) which may be a polyolefin backing film or a protection tape with a low tack adhesive; (v) placing the primed metal layer with the sacrificial layer onto an electrically heated vacuum chuck (vi) placing a masking frame (aka a casting frame) of a defined thickness on the vacuum chuck surrounding the metal layer; (vii) mixing the components of homogenized resin (polyol) and hardener (isocyanate) in a defined ratio prior to application, resulting in a chemical reaction with the liberation of heat (exothermic); (viii) pouring the low viscosity polyurethane mix into the area defined by the masking frame, covering the primed metal surface, and filling any opening, slit or void with resin to form a clear encapsulation layer on one side of the metal layer; (ix) in the case of casting and compression molding, the encapsulation layer may be further compressed with a top plate under vacuum or pressure or a combination thereof to remove gases, isocyanate vapors, moisture and eliminate the formation of bubbles; (x) applying an inert gas to the mold assembly (electrically heated vacuum chuck, masking frame and top plate) such as nitrogen to blanket polyurethane to prevent the ingress of moisture; (xi) demolding from the masking frame after the gel-time and left to cure till the resin is polymerized; (xii) final curing to allow the polymerized resin to reach its final hardness; and (xiii) machining the encapsulation layer on the metal surface to the desired thickness.

SOME ADDITIONAL REFERENCES

The following patents and/or publications ("references") may be of interest or relevant to the invention(s) disclosed herein, and some commentary may be provided to distinguish the invention(s) disclosed herein from some of the following references.

U.S. Pat. No. 11,068,770 Connection bridges for dual interface transponder chip modules
U.S. Pat. No. 10,599,972 Smartcard constructions and methods
U.S. Pat. No. 10,552,722 Smartcard with coupling frame antenna
U.S. Pat. No. 10,518,518 Smart cards with metal layer(s) and methods of manufacture
U.S. Pat. No. 10,248,902 Coupling frames for RFID devices
U.S. Pat. No. 10,193,211 Smartcards, RFID devices, wearables and methods
U.S. Pat. No. 9,960,476 Smart card constructions
U.S. Pat. No. 9,836,684 Smart cards, payment objects and methods
U.S. Pat. No. 9,812,782 Coupling frames for RFID devices
U.S. Pat. No. 9,798,968 Smartcard with coupling frame and method of increasing activation distance of a transponder chip module
U.S. Pat. No. 9,697,459 Passive smartcards, metal cards, payment objects and smart jewelry
U.S. Pat. No. 9,634,391 RFID transponder chip modules
U.S. Pat. No. 9,622,359 RFID transponder chip modules
U.S. Pat. No. 9,489,613 RFID transponder chip modules with a band of the antenna extending inward
U.S. Pat. No. 9,475,086 Smartcard with coupling frame and method of increasing activation distance of a transponder chip module
U.S. Pat. No. 9,390,364 Transponder chip module with coupling frame on a common substrate for secure and non-secure smartcards and tags
2018/0339503 Smartcards with metal layer(s) and methods of manufacture
2018/0341846 Contactless metal card constructions
2019/0114526 Smartcard constructions and methods
2019/0171923 Metallized smartcard constructions and methods
2019/0197386 Contactless smartcards with multiple coupling frames
2019/0392283 RFID transponder chip modules, elements thereof, and methods
2020/0005114 Dual interface metal hybrid smartcard
2020/0034578 Smartcard with display and energy harvesting
2020/0050914 Connection bridges for dual interface transponder chip modules
2020/0151534 Smartcards with metal layers and methods of manufacture
2020/0226443 Smartcard with a booster antenna and a wireless connection between modules
2020/0250504 Manufacturing metal inlays for dual interface metal cards
2020/0250506 Smartcard constructions and methods
2020/0257953 Contactless smartcards with coupling frames
2020/0327387 Smartcard with a coupling frame and a wireless connection between modules
2020/0387768 Contactless metal card constructions
2021/0056374 Transponder chip module with module antenna(s) and coupling frame(s)
2021/0056375 Smart cards with metal layer(s) and methods of manufacture
2021/0182650 Smartcards with Multiple Coupling Frames
2021/0192311 Coupling frames for smartcards with various module opening shapes
2021/0192312 Smart Cards with Metal Layer(s) and Methods of Manufacture
2021/0256341 Smart Cards with Metal Layer(s) and Methods of Manufacture
U.S. Pat. No. 11,250,305 (15 Feb. 2022; Finn)
U.S. Pat. No. 11,113,593 (7 Sep. 2021; Finn)
US 2021/0049431 (18 Feb. 2021; Finn)
US 2021/0049439 (18 Feb. 2021; Finn), issued as U.S. Pat. No. 11,113,593
US 2021/0073608 (11 Mar. 2021; Finn), issued as U.S. Pat. No. 11,347,993
US 2021/0081743 (18 Mar. 2021; Finn et al.)
US 2021/0081748 (18 Feb. 2021; Finn)
US 2021/0110231 (15 Apr. 2021; Finn)
US 2021/0117744 (22 Apr. 2021; Finn et al.)
US 2021/0150294 (20 May 2021; Finn) issued as U.S. Pat. No. 11,341,385 (24 May 2022; Finn)
US 2021/0174159 (10 Jun. 2021; Finn)
US 2021/0216838 (15 Jul. 2021; Finn), issued as U.S. Pat. No. 11,250,305
US 2021/0350198 (11 Nov. 2021; Finn), issued as U.S. Pat. No. 11,315,003

SOME ADDITIONAL REFERENCES

U.S. Pat. No. 6,452,563 (17 Sep. 2002; Gemplus aka Gemalto; Porte)
U.S. Pat. No. 6,491,229 (10 Dec. 2002; NJC Innovations; Berney)
U.S. Pat. No. 7,306,163 (11 Dec. 2007; IBM; Scholz et al.)
U.S. Pat. No. 7,701,350 (20 Apr. 2010; Hitachi; Sakama, et al.)
U.S. Pat. No. 8,186,582 (29 May 2012; American Express; Varga et al.)
U.S. Pat. No. 8,393,547 (12 Mar. 2013; Perfect Plastic Printing; Kiekhaefer et al.)
U.S. Pat. No. 8,523,062 (3 Sep. 2013; American Express; Varga et al.)
U.S. Pat. No. 8,608,082 (17 Dec. 2013; Oberthur Technologies, aka IDEMIA; La Garrec et al.)
U.S. Pat. No. 8,725,589 (13 May 2014; JPMorgan Chase; Skelding et al.)
U.S. Pat. No. 8,737,915 (27 May 2014; J. H. Tonnjes E. A. S. T.; Beenken)
U.S. Pat. No. 9,024,763 (5 May 2015; Hamedani Soheil)
U.S. Pat. No. 9,299,020 (29 Mar. 2016; TheCard; Zimmerman et al.)
U.S. Pat. No. 9,390,366 (12 Jul. 2016; CompoSecure; Herslow et al.)
U.S. Pat. No. 9,564,678 (7 Feb. 2017; Murata Manufacturing; Kato et al.)
Reference is also made to U.S. Pat. Nos. 8,976,075, 9,203,157 and 9,231,305.
U.S. Pat. No. 9,721,200 (1 Aug. 2017; CompoSecure; Herslow et al.)
U.S. Pat. No. 9,760,816 (12 Sep. 2017; American Express; Williams et al.)
U.S. Pat. No. 9,836,687 (5 Dec. 2017; American Express; Williams et al.)
U.S. Pat. No. 9,881,247 (30 Jan. 2018; Le Garrec et al.)
U.S. Pat. No. 9,898,699 (20 Feb. 2018; CompoSecure; Herslow et al.)
U.S. Pat. No. 10,089,570 (2 Oct. 2018; CompoSecure; Herslow et al.)

U.S. Pat. No. 10,140,569 (27 Nov. 2018; Kim et al.)
U.S. Pat. No. 10,275,703 (30 Apr. 2019; CompoSecure; Herslow et al.)
U.S. Pat. No. 10,289,944 (14 May 2019; CompoSecure; Herslow et al.)
U.S. Pat. No. 10,318,859 (11 Jun. 2019; CompoSecure; Lowe, et al.)
U.S. Pat. No. 10,445,636 (15 Oct. 2019; Giesecke & Devrient; Virostek et al.)
U.S. Pat. No. 10,534,990 (14 Jan. 2020; CompoSecure; Herslow et al.)
U.S. Pat. No. 10,583,683 (10 Mar. 2020; Federal Card Services; Ridenour et al.)
U.S. Pat. No. 10,748,049 (18 Aug. 2020; CompoSecure; Herslow et al.)
U.S. Pat. No. 10,885,419 (5 Jan. 2021; CompoSecure; Lowe et al.)
U.S. Pat. No. 11,151,437 (19 Oct. 2021; CompoSecure; Lowe et al.)
U.S. Pat. No. 11,182,662 (23 Nov. 2021; CompoSecure; Lowe)
US 2011/0181486 (28 Jul. 2011; Murata; Kato), reference is also made to US 2011/0186641
US 2012/0112971 (10 May 2012; Panasonic; Takeyama et al.)
US 2013/0126622 (23 May 2013; AmaTech; Finn)
US 2014/0091149 (3 Apr. 2014; Finn et al.)
US 2014/0231503 (21 Aug. 2014; Smart Co.; Kunitaka)
US 2015/0206047 (23 Jul. 2015; CompoSecure; Herslow)
US 2015/0221624 (6 Aug. 2015; Sandisk; Ye et al.)
US 2019/0050706 (14 Feb. 2019; CompoSecure; Lowe) now U.S. Pat. No. 10,406,734
US 2019/0073578 (7 Mar. 2019; CompoSecure; Lowe et al.)
US 2019/0156994 (23 May 2019; X-Card Holdings; Cox)
US 2019/0160717 (30 May 2019; CompoSecure; Lowe)
US 2019/0236434 (1 Aug. 2019; CompoSecure; Lowe)
US 2019/0286961 (19 Sep. 2019; CompoSecure; Lowe)
US 2019/0291316 (26 Sep. 2019; CompoSecure; Lowe) (now U.S. Pat. No. 10,583,594).
US 2019/0311235 (10 Oct. 2019; Giesecke & Devrient; Sexl et al.)
US 2019/0311236 (10 Oct. 2019; Giesecke & Devrient; Sexl et al.)
US 2019/0384261 (19 Dec. 2019; Kona I; Nam et al.)
US 2019/0354825 (21 Nov. 2019; CompoSecure; Lowe)
US 2020/0151535 (14 May 2020; CompoSecure; Herslow et al.) now U.S. Pat. No. 10,748,049
US 2020/0164675 (28 May 2020; FCS; Ridenour et al.)
US 2020/0364531 (19 Nov. 2020; CompoSecure; Lowe et al.)
US 2020/0364532 (19 Nov. 2020; CompoSecure; Herslow et al.)
US 2021/0073606 (11 Mar. 2021; CompoSecure; Lowe et al.)
US 2021/0073607 (11 Mar. 2021; CompoSecure; Lowe et al.)
US 2021/0154898 (27 May 2021; CompoSecure; Lowe et al.)
US 2021/0158124 (27 May 2021; CompoSecure; Lowe et al.)
US 2021/0209437 (8 Jul. 2021; CompoSecure; Lowe et al.)
US 2021/0232887 (29 Jul. 2021; Ritter)
US 2022/0058457 (24 Feb. 2022; Thales; Meridiano et al.)
US 2022/0253661 (11 Aug. 2022; Daley et al.)
Chen, S. L., Kuo, S. K. and Lin C. T. (2009) incorporated by reference herein, discloses "A metallic RFID tag design for steel-bar and wire-rod management application in the steel industry" (Progress in Electromagnetics Research, PIER Vol. 91: pp. 195-212.)
EP 0 494 471 (1 Jan. 1992; Chubb Lips; Nieuwkoop)
JP 4016322 (5 Dec. 2007; FEC; Takeda)
EP 2372840 (25 Sep. 2013; Panasonic; Hashimoto) including US 2011/0227799
U.S. Pat. No. 8,665,069 (4 Mar. 2014; Petratec; Weitzhandler et al.)
CN 205158409U (13 Apr. 2016)
WO 2017/090891 (1 Jun. 2017; Biosmart; Yoon et al.)
KR 10-1754985 (30 Jun. 2017; Aichi CK Corporation aka ICK; Kim et al.)
PCT/US2019/020919 (12 Sep. 2019; X-Card Holding; Cox)
US 2004/0118930 (24 Jun. 2004; American Express; Berardi et al.)
US 2019/0114526 (18 Apr. 2019; Finn et al.)
US 2019/0171923 (6 Jun. 2019; Finn)
US 2016/0180212 (23 Jun. 2016; Herslow et al)
WO 2017/162311 (28 Sep. 2017; Zwipe AS)
WO 2017/177905 (19 Oct. 2017; Hightec Tech)
WO 2018/132404 (19 Jul. 2018; CompoSecure, LLC)
U.S. Pat. No. 3,214,324 (26 Oct. 1965; General Mills; Peerman)
U.S. Pat. No. 6,329,958 (11 Dec. 2001; TDK; McLean et al.)
U.S. Pat. No. 6,817,085 (16 Nov. 2004; TDK; Uchikoba et al.)
U.S. Pat. No. 7,948,057 (24 May 2011; TDK; Furukawa et al.)
U.S. Pat. No. 8,158,018 (17 Apr. 2012; TDK, Nakahata et al.)
U.S. Pat. No. 9,673,506 (6 Jun. 2017; TDK; Asou et al.)
US 2017/0271746 (21 Sep. 2017; TDK; Komachi et al.)

SOME ADDITIONAL REFERENCES

The following references may also be applicable to the invention(s) disclosed herein:
U.S. Pat. Nos. 6,581,839, 6,749,123, 6,764,014, 7,306,158, 7,377,443, 7,607,583, 7,837,116, 8,066,190, 8,186,598, 7,494,057, 7,530,491, 7,819,310, 7,823,777, 7,971,786, 8,033,457, 8,079,514, 8,186,582, 8,523,062, 9,760,816, 9,836,687
U.S. D879,196, U.S. D942,538 and US 943,024
WO 2007/049273 (3 May 2007; Vilnai et al.)
WO 2007/049274 (3 May 2007; Weitzhandler et al.)
U.S. Pat. No. 7,237,724 (3 Jul. 2007; Singleton)
U.S. Pat. No. 7,607,249 (27 Oct. 2009; Innovatier; Singleton)
U.S. Pat. No. 7,959,085 (14 Jun. 2011; Innovatier; Singleton)
U.S. Pat. No. 8,657,983 (25 Feb. 2014; Innovatier; Singleton)
U.S. Pat. No. 8,727,224 (20 May 2014; Innovatier; Singleton)
U.S. Pat. No. 9,258,898 (9 Feb. 2016; FiTeq; Singleton)
U.S. Pat. No. 6,687,131 (3 Feb. 2004; Sokymat; Miehling)
U.S. Pat. No. 7,012,530 (14 Mar. 2006; NagraID; Droz)
U.S. Pat. No. 7,205,899 (17 Apr. 2007; Schreiner Group; Surkau)
U.S. Pat. No. 5,498,388 (12 Mar. 1996; Mitsubishi; Kodai et al.)
U.S. Pat. No. 6,025,054 (15 Feb. 2000; CardXX; Tiffany)
U.S. Pat. No. 6,241,153 (5 Jun. 2001; CardXX; Tiffany)
U.S. Pat. No. 6,256,873 (10 Jul. 2001; CardXX; Tiffany)
U.S. Pat. No. 7,220,615 (22 May 2007; Micron Technology; Bolken)
U.S. Pat. No. 7,225,537 (5 Jun. 2007; CardXX; Reed)

U.S. Pat. No. 8,012,809 (6 Sep. 2011; CardXX; Reed)
U.S. Pat. No. 8,324,021 (4 Dec. 2012; CardXX; Reed)
U.S. Pat. No. 9,916,992 (13 Mar. 2018; Dynamics; Mullen et al.)
U.S. Pat. No. 11,392,860 (19 Jul. 19, 2022; Dynamics; Mullen et al.)
US 2016/0108291 (21 Apr. 2016; Novacel; Jean-Loup Masson et al.)
US 2010/0255300 (7 Oct. 2010; Novacel; Catherine Coutey et al.)

Some Definitions

Some of the following terms may be used or referred to, herein.

Booster Antenna Circuit

A booster antenna circuit in a metal transaction card may comprise a perimeter coil component with a given number of windings extending around the periphery edge of the card body, a coupler coil component with a given number of windings, a capacitor bank component connected in parallel with the coupler coil for frequency trimming, and a secondary coil component(s) contributing to energy harvesting. The components of the booster antenna circuit (e.g., tracks, windings or turns, parallel plates, vertical interconnects) may reside on both sides of a carrier layer. The carrier layer may comprise polyethylene terephthalate (PET).

In a conventional booster antenna circuit (chemically etched circuitry, plated copper circuitry, conductive printed circuitry or equivalent), the perimeter coil on the periphery of the card body inductively couples with the contactless reader while the coupler coil inductively couples with the module antenna of a transponder chip module driving the RFID payment chip.

The secondary coil(s) has or have a range of functions including tuning, additional power generation, picking up surface currents at the edges and inner locations of the card body, coupling to other components such as to a biometric sensor, and customized to drive sound, piezo haptic actuator, light and display devices.

The coupler coil may be an open or closed loop circuit being assembled on the PET carrier layer having vertical interconnects to the upper and lower plate electrodes of the capacitor bank.

In some card constructions, the perimeter coil may be eliminated, with the coupler coil coupled inductively to an in-card discontinuous metal layer having a slit, opening, a metal ledge and metal edges, functioning as a one turn RLC circuit.

The booster antenna circuit is assembled to a continuous metal layer using a magnetic shielding layer to offset the effects of field attenuation caused by the continuous metal layer.

Magnetic Shielding

Magnetic shields have historically been ferrite-based materials, but non-ferrite materials having properties that impact RF performance are used in metal card applications. Magnetic shields can be powdered iron, ferrite, permalloy, polymer-based or a whole host of other materials (e.g. nanocrystalline).

Thermosetting Resin

The International Union of Pure and Applied Chemistry (IUPAC) defines a thermosetting resin as a petrochemical in an indulgent solid or viscous state that changes irreversibly into an infusible, insoluble polymer network by curing.

Thermosetting resins undergo chemical reactions (curing process) that crosslink the polymer chains and thus connect the entire matrix together in a three-dimensional network. Once cured, they cannot be remelted or reformed. Thermosetting resins tend to have high dimensional stability, high-temperature resistance, and good resistance to solvents because of their three-dimensional cross-linked structure.

Thermosetting resins describe a generic family of products that includes unsaturated polyesters, vinyl esters, epoxy, and polyurethane resins. The materials used with them are generally described as hardeners, curing agents, peroxide initiators, isocyanates, fillers, and flexibleness.

Thermosetting resins are popular because uncured and at room temperature they are in a liquid state. Common thermosetting resins include polyester resin, vinyl ester resin, epoxy, phenolic and urethane. They are commonly used in polyester fiberglass systems, sheet molding compounds, polyurethanes and adhesives.

Reference: Handbook of Thermoset Plastics, 4th Edition, Oct. 21, 2021, Editor: Hanna Dodiuk Polyurethane A polyurethane (PU) is typically produced by reacting an isocyanate with a polyol. Since polyurethane contains two types of monomers, which polymerize one after the other, they are classed as alternating copolymers. It is a versatile polymeric material that can be tailored to meet the demands of a number of adhesive and sealant systems.

Polyurethane Resins

Any resin resulting from the reaction of diisocyanates (such as toluene diisocyanate) with a phenol, amine, or hydroxylic or carboxylic compound to produce a polymer with free isocyanate groups; used as protective coatings, potting or casting resins, adhesives, rubbers, and foams, and in paints, varnishes, and adhesives.

They are synthetic resins that have two-component systems which consist of a polyol component (resin) and an isocyanate component (hardener) that must be mixed in a defined ratio prior to application. Synthetic resins are thinner than epoxy resins, making them very easy to mix; they also work very well in molds.

Polyurethane Adhesives

Adhesives based on polyurethane (PU) resins show good strength at low and high temperatures and are resistant to chemicals, water and humidity. The polyurethane polymer forms rigid and soft domains that give the polymer its balance of flexibility and high strength.

Reference: Handbook of Adhesives and Sealants, Volume 2, 2006, Pages 355-480, xl-xlii Epoxy Epoxy is the family of basic components or cured end products of epoxy resins. Epoxy resins, also known as polyepoxides, are a class of reactive prepolymers and polymers which contain epoxide groups. The epoxide functional group is also collectively called epoxy. The IUPAC name for an epoxide group is an oxirane. It is a type of petroleum-based adhesive. Epoxy contains the important element, epocholohydrin, which forms a hard layer that is highly resistant to excessive cold, heat, and moisture.

Epoxy Resins

Epoxy resins may be reacted (cross-linked) either with themselves through catalytic homopolymerisation, or with a wide range of co-reactants including polyfunctional amines, acids (and acid anhydrides), phenols, alcohols and thiols (usually called mercaptans). These co-reactants are often referred to as hardeners or curatives, and the cross-linking reaction is commonly referred to as curing.

They are often referred to as laminating resins and are well suited for coating surfaces. They may be mixed with colorants and filling materials to get the desired results.

Epoxy Adhesives

They are considered the strongest of all types of adhesives. They are used to build vehicles, planes, as well as sports equipment. They are water-resistant and are solvent-free.

B-Staged Epoxy

This is a descriptive term used to define a one component epoxy system, using a latent (low reactivity) curing agent. This unique product can be partially cured (sometimes referred to as "pre-dried"), as an initial stage after being applied onto one substrate/surface. It can, at a later time, be completely cured under heat and pressure.

Partially cured epoxy, or B-staged epoxy adhesive, does have processing advantages. The adhesive can have its initial application and partial cure in one location, and its final cure in another location weeks later.

C-Staged Epoxy

The B stage is a solid, thermoplastic stage. When given additional heat, the B-stage epoxy will flow and continue to cure to a crosslinked condition or C stage.

Urethane Casting

Urethane casting uses silicone or metal molds to produce plastic and rubber components using two-component polyurethane resins under a vacuum. Also known as vacuum casting or polyurethane casting, it is a versatile manufacturing technology capable of producing complicated engineering parts in polyurethane resins and cast nylon by simulating injection molding. Because the process takes place inside a vacuum chamber, it creates high-quality bubble-free casting with a smooth surface texture and no defects. Urethane resins are also available to make entirely opaque, translucent, or transparent cast parts.

Urethane Casting Vs Injection Molding

Urethane casting and injection molding are similar processes that can create identical plastic parts using similar materials. However, in contrast to urethane casting, which relies on gravity to fill the molds, injection molding employs a pressured nozzle to push the molten plastic into the mold cavity.

Reaction Injection Molding (RIM)

Reaction injection molding (RIM) is similar to injection molding except thermosetting polymers are used, which requires a curing reaction to occur within the mold.

In this process, highly reactive plastic liquids are mixed under high pressure and then injected into a mold to react, polymerize and produce principally polyurethane thermoset plastic or thermoplastic parts.

Instead of using already polymerized materials as matrices, highly reactive monomeric or oligomeric ingredients are placed in two tanks which are then quickly mixed by impingement and injected into the mold cavity. As soon as the two materials are mixed, chemical reaction begins to form a polymeric matrix which completes typically within 5-30 s. The major portion of the reaction injection molding machine is a high-pressure pump and a metering system.

RIM can be used for the production of polyurethane, ureaformaldehyde, nylon, styrene class resin, and epoxy resin for use in automobile parts.

Reaction Assisted Molding Process (RAMP)

It is an offshoot of existing Reaction Injection Molding (RIM) molding technology, being used to encapsulate electronics into smart cards without requiring the traditional layering manufacturing process.

RAMP is based on low pressure and low temperature dispensing of polyurethanes (unlike RIM which is based on high pressure and temperature).

The RAMP technique precisely positions computer chips and electronic components within a mold between two sheets of PVC or polycarbonate film, after which a polyurethane mixture is injected at low temperature and low pressure to completely immerse the electronic element. The electronic element is securely encapsulated and protected when curing is completed in less than an hour.

Reference is made to: https://www.plasticsnet.com/doc/first-reaction-injection-molding-now-reaction-0001

Mold Casting

It is a manufacturing process in which a liquid material is poured into a mold, which contains a hollow cavity of the desired shape, and then allowed to solidify. The solidified part (i.e. casting) is ejected or broken out of the mold to complete the process. The casting material is a time setting liquid that cures after mixing two or more components together; examples are thermosetting epoxies and polyurethanes.

Thermosetting epoxies are rigid polymeric materials that are resistant to higher temperatures than ordinary thermoplastics. These materials are normally made up of lines of polymers, which are highly cross-linked that irreversibly cure. Polyurethanes are synthetic resins or plastics that result from a polyaddition reaction between dialcohols or polyols and polyisocyanates. Essentially, polyurethanes have a higher cross-link density than epoxies, making them more durable.

In general, the casting resin consists of a two-component system of resin and hardener, which hardens after mixing through a chemical reaction. PU casting resins can, just like epoxy resin and polyester resin, be combined with various additives as well as filling materials or colorants. This gives them the desired properties. For example, an inhibitor can be added to the resin to increase the so-called pot life, i.e., the processing time.

There are also color pigments and fluorescent dyes that can give the polyurethane resin a specific color. Examples of fillers are, among others, cotton flocks, glass fibers, mineral fillers, and lightweight fillers. Also, fillers can be added to the resins to influence properties such as mechanical strength, stiffness, surface hardness, and in the case of metal transaction cards the fillers influence the drop acoustics. Reference: https://en.wikipedia.org/wiki/Casting and https://resin-expert.com/en/guide/polyurethane-resin Casting Polyester Resin In its liquid form, casting polyester resin has a consistency of corn syrup and a slight color ranging from straw to light aqua. During the hardening process the slight color bleaches out and the resin becomes crystal clear.

Added to liquid casting resin, catalyst (hardener) produces a chemical reaction, which generates heat, causing the resin to harden.

Coating of Metal

A coating, such as polyurethane resin, is a covering that is applied to the surface of a substrate such as a metal layer, a metal inlay, a metal frame or a metal chassis. The purpose of applying the coating may be to fill openings, voids or recesses in the substrate, to encapsulate the substrate, and or to encase any components or devices assembled thereto.

Functional coatings may be applied to change the surface properties of the substrate, such as the acoustic properties of the substrate, mechanical robustness of the substrate, electrical isolation of the substrate, radio frequency response of components and devices assembled to the substrate, protection of the surface of the substrate from environmental conditions, and to fill and cover openings, apertures, voids and recesses in the substrate, with the coating forming an essential part of the finished product.

A major consideration for most coating processes is that the coating is to be applied at a controlled thickness. After applying the coating, a compression step (under vacuum) may be implemented to extract any air pockets or release of gases. After contraction and curing of the coating over a long duration, the solidified coating may be mechanically planed to a certain thickness.

An adhesion promoter such as a primer (chemical bonding agent) or a single layer of thermosetting adhesive film may be applied to the substrate, before coating the substrate. An adhesion promoter encourages the subsequent coating to adhere well.

Adhesion Promoter

A primer in the form of a chemical bonding agent is a low viscous liquid (e.g. 30 mPa·s) for the pre-treatment of metal surfaces to promote the adhesion of polyurethane thereto. Adhesion can be further improved with surface treatment such as sanding, ultrasonic cleaning, blasting and chemical activation or combinations of these before applying the primer. The primer is applied in a single coat to the metal surface by spraying, dipping, coating or screen printing. Ideally, the film thickness of the primer is very thin (5 μm to 15 μm).

A typical primer is comprised of film-forming polymers, cross-linkable resins, fillers, and a solvent or water-based carrier system.

Two-coat adhesive formulations for coating polyurethane to metal may comprise a primer layer and an adhesive topcoat. The primer provides a means of obtaining robust adhesion to the metal substrate such as stainless steel while providing the necessary reactivity with the adhesive topcoat for bonding to polyurethane.

Sacrificial Layer

To protect sheet metal from scratches during mechanical processing, a number of protective release films and peel-off films with low tack adhesive are available, such as polyethylene film tape with an acrylic low tack adhesive and plasticized PVC film with low tack adhesive. The sacrificial layer may be polytetrafluoroethylene (PTFE, Teflon®) or a polyolefin backing film.

Release Agent

Also known as a mold release agent is a chemical used to prevent other materials such as adhesives or plastics from bonding to surfaces such as metal. Release agents provide the critical barrier between a molding surface and the substrate, facilitating separation of the cured part from the mold. Many kinds of release agents are used. They are waxes, fatty ester, silicones, and metallic soaps.

Silicone release agents are widely used as additives (having nonstick properties) in mold release applications where they enable quicker release of products made in molds.

Lapping Cured Polyurethane Resin

There are several methods to horizontally lap cured thermosetting polyurethane (PU) resin bonded to a metal layer such as stainless steel, to reduce the thickness of the PU, and to accomplish ultra-high precision geometries. Planing is a machining process that uses linear relative motion between a workpiece (e.g., PU coated metal inlay) and a single point cutting tool, to generate an accurate flat surface. Grinding (abrasive cutting) uses a grinding wheel as cutting tool. Lapping is a machining process in which two surfaces are rubbed together with an abrasive between them.

Roll Coating System

A roll coating system coats a polymeric material (single or 2-component formulation) such as a thermosetting epoxy or polyurethane resin for all-over coating of a substrate and parts with irregular shapes. A roll coating system typically has a resin reservoir, a coating drum, a doctor blade and a conveyor roller, with the width of the drum dictating the width of the coating being applied to the substrate. In order, to avoid resin spillage during application, the substrate may be larger than the start and stop positions of the coating. A sacrificial layer may be applied to one side of the substrate for protection, and should the substrate have any apertures, openings or windows. Reference is made to:

https://www.hardo.eu/adhesive-technology/?lang=en

Slot Die Coating

Slot coating is a high-precision coating method used to deposit a thin liquid film onto a moving substrate. It is a pre-metered coating method, where film thickness is directly controlled by the flow rate and web speed. Slot die coating may also be referred to as "slot nozzle coating".

The liquid flow in the application region, so called the coating bead, is strongly affected by operating parameters, liquid properties, and design parameters, such as web speed, surface tension, and geometry of the coating die.

Slot die coating technology is an alternative process to roll coating.

Metal Surface Treatment (Corona)

Treating metal surfaces is primarily a surface cleaning issue. Plasma treatment is a process designed to change the surface properties of a substrate to increase surface energy and/or make it chemically compatibility with a bonding material. Plasma treatment creates an electron bombardment that breaks the surfaces chemical bonds while the ions hitting the surface are designed to alter the chemical composition of the surface. Plasma systems may also be used to treat a variety of material types including polymers, glass and ceramics.

Passivation

Passivation is a non-electrical metal finishing process to help prevent metal surfaces from corrosion and pitting. The chemical treatment for stainless steel and other alloys makes the metal more resistant to rust and reduces chemical reactivity.

Metal Inlay Passivation

It involves immersing a stainless steel sheet in an acid bath (usually nitric or citric acid). The process removes free iron from stainless steel surfaces. When the stainless steel is exposed to oxygen containing environments, a thin chromium oxide film layer is formed. While most stainless steels naturally form this protective oxide layer, the passivation process thickens the layer and significantly speeds up the process. The oxide layer creates a passive surface that acts as protection from corrosive environmental stimuli.

Polishing and Buffing

Polishing and buffing are finishing processes for smoothing a metal card surface using an abrasive and a work wheel or a leather strop. Polishing is a more aggressive process while buffing is less harsh, which leads to a smoother, brighter mirror finish. The buffing process may achieve a surface roughness averaging less than 3 μm Ra.

Electro-Polishing

It is an electrochemical process that removes material from a metal sheet, reducing the surface roughness by levelling micro-peaks and valleys, improving the surface finish. It is used to polish, passivate, and deburr metal sheets and cards.

Mechanical Engraving

The front face continuous metal layer and or the rear discontinuous metal layer of a metal card body may be electro-polished stainless steel (ANSI 301, 304 or equivalent) or brushed stainless steel, with a combination of laser and mechanical engraving elements.

The mechanical engraving to create distinct features may have a depth of 12.7 µm (5/10 of a mil). Laser engraving features may compliment mechanical engraving features. The mechanical engraving and or laser etching of features may be followed by plating of precious metal such as gold or platinum. Alternatively, the engraving and etching process may be performed post plating.

Highly polished surfaces may be protected by a hydrophobic oleophobic ceramic coating, an electro-coat (e-coat) or an UV clear coat.

Physical Vapor Deposition (PVD)

PVD, also known as thin-film coating, is a process to produce a metal vapor (titanium, chromium and aluminum) that can be deposited on electrically conductive materials as a thin highly adhered pure metal or alloy coating. The process is carried out in a chamber under vacuum using a cathodic arc source. The coating compounds are made up of various elements such as carbides, nitrides, borides and silicide. A wide variety of colors can be achieved by adding different gases during the deposition.

Compound materials may be deposited atom by atom, forming a thin, bonded, metal or metal-ceramic surface layer that greatly improves the appearance, durability, and/or function of a metal layer in a metal card body. Reference is made to U.S. Pat. Nos. 5,037,522 and 9,580,817.

Metallization Process of a Metal Inlay

The process involves applying a decorative thin metal film coating to a metal layer in order to provide a desired aesthetic appearance in combination with a durable protective coating. The imparting of the actual metal finish occurs in a physical vapor deposition process as already described. The process utilizes a thermoset polymeric coating material for the base leveling coat as well as the top protective coat, further utilizes a radiation cured pre-metallization leveling layer, followed by a metal film layer. Reference is made to U.S. Pat. No. 10,934,441.

Diamond-Like Carbon

Diamond-like carbon (DLC) coating is a class of amorphous carbon material that displays some of the typical properties of diamond. The coatings have unique properties such as low friction, high hardness, high corrosion resistance and good transmission in the infrared. Amorphous diamond-like carbon coatings (DLC) are deposited by PACVD or PVD processes.

Gold Plating

Gold plating refers to a method of applying a layer of gold onto the surface of a polished metal layer such as stainless steel via an electrochemical plating process. In general, gold plating is a pure, hard, electrochemically deposited gold coating that combines the theoretical reflectivity and emissivity of gold.

E-Coating

Electro-coating (E-Coat), also known as an electrophoretic painting process, is a process where a metal sheet or metal inlay (conductive material) is immersed in a bath of a water-based solution containing an emulsion. The coating materials (resins, pigments, additives, etc.) are dispersed in the water and suspended in the bath to form the emulsion. An electric voltage is applied to the metal sheet using it as an electrode causing the emulsion to condense, deposit and adhere to its conductive surface. A sheet can be painted both on its exposed surface and within recessed or engraved areas, wherever the liquid is able to reach. The coating thickness (typically 10-25 µm) is limited by the applied voltage (typically 30-150 volts for 30 to 90 seconds). The coated metal sheet can then be removed from the bath and the coating is cured by baking in an oven (typically a cure schedule of 160° C. (320° F.) for 20 minutes) to make it hard and durable. The metal is insulated by the coating, preventing electrostatic-discharge in metal cards.

Cathodic epoxy e-coat is the conventional type of e-coat used to provide corrosion resistance to automotive parts. It is widely used in the automotive industry, as it provides superior salt spray, resistance to humidity, and cyclic corrosion resistance.

E-coating of metal sheets for metal card production delivers a wide range of lacquer and paint finishes with decorative effects. The coating type in a cathodic electro-coat system may be polyurethane.

UV Gloss Inks and Curing

Ultraviolet cure (UV) inks are dependent on a high dosage of ultraviolet light to initiate cure, the process that converts the ink from a wet to a dry film. The light must, in effect, see through or penetrate the layer of ink to achieve proper cure. Light energy level requirements vary from ink to ink and are dependent on a number of factors: ink chemistry, color; ink deposit (film weight), substrate being printed such as coated metals, and halftone or line color.

The UV inks are typically applied to a metal surface using a screen printer through screen meshes between 305 to 420 (140 to 165/cm) monofilament polyester. In a metal card application a clear UV ink is first deposited on a metal surface, followed by a powder coating which is further protected by an additional clear coat of UV ink.

Powder Coating

Powder coating is a finishing process in which dry, free-flowing, thermoplastic or thermoset powder material is applied to a surface, melted, and hardened into an even coating. This finishing process is suitable for various materials, including metals and plastics, and can provide both functional and decorative surface coatings in a wide range of colors, finishes, and textures that are not readily achievable by conventional liquid coating methods.

There are two main methods of powder coating—electrostatic spray deposition (ESD) and fluidized bed application.

Fluidized bed powder coating: Unlike in ESD where the liquid paints materials are electrostatically sprayed and adhered onto a surface, in fluidized bed powder coating, preheated parts are dipped into the powder material within a fluidized bed. There is also an alternative option called electrostatic fluidized bed powder coating, which generates a cloud of electrically charged powder particles above the fluidized bed through which a part is passed to be coated.

The process is a multi-step surface finishing process which includes a preparation, application, and curing stage, and, at a minimum, utilizes a spray gun, spray booth, and curing oven.

Ceramic Coatings

Ceramic coatings are used to improve the surface properties of metal materials including anti-fouling, self-cleaning, corrosion resistance, wear resistance, oil/water separation and biocompatibility.

Ceramics materials can be divided into oxide ceramics and non-oxide ceramics according to their compositions. Many oxide ceramics are metal oxides forming oxide films on their surfaces. Also, diverse non-oxide ceramic materials are used to functionalize the surfaces of metal materials.

Ceramic coating types include titania (TiO$_2$), alumina (Al$_2$O$_3$), silica (SiO$_2$), manganese dioxide (MnO$_2$), etc.

Nano Coating

Nano-coating is also known as a ceramic coating and is the process of applying a surface layer that repels dry particles, water, oil and dirt. For instance, a nano coating can make a surface scratch resistant, improve hardness, or make it resistant to bacteria.

Oleophobic Coating (Anti-Fingerprint)

An oleophobic coating is an oil repellent coating. A useful aspect of oleophobic coatings are that they can make materials fingerprint resistant because they repel the oils that are produced by the skin. Thus, oleophobic coatings may be used to make smudge resistant high gloss metal cards. The oleophobic coating may be accompanied by an ion-strengthened ceramic shield for improved smudge resistance.

Hydrophobic Oleophobic Ceramic Coating

Combining a hydrophobic and oleophobic surface with ceramic structure for protection from water, oil, UV, corrosion, and abrasion.

Knockout

In design and printing, using a knockout is the opposite of overprinting. Instead of printing an element in one color on top of another color, the top element is knocked out of the base element so its true color shows. A knockout removes a portion of the bottom image.

When two colors overlap, they don't normally print on top of each other. The bottom color is knocked out—not printed—in the area where the top color overlaps. If the overlapping colors were printed, you could potentially see the effect the base color on the top element.

In other words, An area where an underlying color has been cut out so that the overprinting color can remain pure.

Reinforcing a Slit in a Front Face Metal Layer

A discontinuity such as a slit (S) in a front face metal layer (ML, DML, FML) forming a card body results in mechanical instability of the card body and the presence of the slit is regarded as a defect. The thickness of the front face metal layer may range from 6 mils to 20 mils, and may be supported by an underlying metal layer having a slit. Several techniques have been developed to fill the slit with the objective to reinforce the card body while at the same time camouflaging the slit with primer and ink or a powder coating. Such methods include injection and transfer molding, and filling the slit with a compound (filler) having a matching color (pigmented) to the metal and under compression (staged temperature and pressure cycles) in a vacuum oven curing the filler to a solid state. The filling process may also be stepped, by partially filling the slit with a compound followed by compression and curing, and then returning and repeating the process until the slit is completely filled. The filling process is followed by a polishing process to achieve flatness to the exposed front surface. In a thick metal layer, the slit may be formed by laser cutting at an angle and beveling the edges of the slit, to support the filling process and overall mechanical stability.

SUMMARY

The invention may relate to innovations in or improvements to RFID-enabled metal-containing transaction cards.

The invention may relate to some improvements in the manufacturing, performance and/or appearance of smartcards (also known as transaction cards), such as metal transaction cards and, more particularly, to RFID-enabled smartcards (which may be referred to herein simply as "cards") having at least contactless capability, including dual interface (contact and contactless) smartcards, including cards having a metal layer in the stack-up of their card body, and including cards having a card body which is substantially entirely formed of metal (i.e., a metal card body).

The invention may relate to innovations in or improvements to RFID-enabled (contactless capable) metal smartcards or metal transaction cards with/having a metal inlay forming a metal card body, and various stack-up constructions.

The smartcards (transaction cards) disclosed herein may be "one-sided", in that they may only operate in contactless mode when the back (rear) side of the card is presented to an external reader, such as a contactless POS (point of sale) terminal. The front of the card has a continuous metal layer, without a slit, and therefore cannot function well in contactless mode.

A shielding layer and an amplifying element may be disposed behind the front metal layer to enable contactless functionality when the back side of the card is presented to the reader.

It is an object of the invention to produce an RFID-enabled metal transaction card comprising a front face metal layer without a slit accompanied by a magnetic shielding layer, an adhesive spacing layer, a booster antenna circuit and a rear synthetic layer, operating in contactless mode from the rear side of the card body with an activation distance greater than (or at least) 4 cm and having drop acoustics which sound like metal.

According to the invention, generally, a discontinuous metal layer (ML, DML) having a module opening (MO) and a slit (S) may be encapsulated (coated) on a first (such as bottom, rear) side thereof with a thermosetting resin such as polyurethane to surface coat the metal and fill the module opening and slit with resin. After said encapsulation, a primer may be applied to the other (top, front) side of the metal layer followed by applying a decorative coating of ink or thermoset powder to cover (coat) the front surface of the metal layer and camouflage the slit. Said metal layer may form a front face metal layer (ML, FML) of a metal transaction card. A discontinuous rear metal layer (ML, DML, RML) having a module opening (MO) and a slit (S) may also be encapsulated with a thermosetting resin to mechanically support the front face metal layer.

Stated otherwise, a discontinuous metal layer (DML) may be encapsulated with thermosetting resin or polyurethane from a back (rear) side thereof, with a sacrificial layer disposed on (applied to) the top (front) side (surface) thereof to keep the thermosetting resin or polyurethane within the module opening and slit in the discontinuous layer. Then, after the thermosetting resin or polyurethane is cured or hardened, the sacrificial layer may be removed from the front (or top) surface of the discontinuous metal layer which may then have primer disposed thereon by a process of spraying or printing. After the primer is dry (or cured), thermoset powder may be sprayed on the front surface (i.e., on the primer) of the discontinuous metal layer, and caused to dry such as by applying heat.

According to the invention, generally, a method of making a metal transaction card may comprise: providing a top metal layer (TML) having a laser-cut module opening (MO) and a slit (S) extending from a front surface of the top metal layer to a rear surface thereof, passivating the top metal layer after laser-cutting and ultrasonic cleaning; depositing a primer in a single screen printing step or in multiple steps to the rear surface of the top metal layer and allowing the primer to dry in an oven; providing a sacrificial layer (SL)

on the front surface of the top metal layer; mold casting the rear surface of the primer coated metal layer and (back) filling the module opening and slit with a low viscosity thermosetting resin (TR) such as polyurethane; allowing the thermosetting resin to cure (harden); machining the fully cured thermosetting resin to a defined thickness (e.g. 50 µm); removing the sacrificial layer; priming the front surface of the top metal layer with an undercoating liquid for inkjet printing (comprising an aliphatic monomer, acrylic oligomer, aromatic monomer, photo-initiator and additives), acrylic base or an acrylic clear powder followed by drying in an oven before digital inkjet printing; inkjet printing hard ink and knockout graphics to the front surface of the bottom metal layer (BML); applying a scratch resistant protective coating to the printed artwork which can be laser engraved for personalization purposes; providing a bottom metal layer (BML) having a laser-cut module opening (MO) and a slit (S) extending from a front surface (face-down side) of the bottom metal layer to a rear surface thereof; passivating the bottom metal layer after laser-cutting and ultrasonic cleaning; depositing a primer to the rear surface of the bottom metal layer and allowing the primer to dry in an oven; providing a sacrificial layer (SL) on the front surface of the bottom metal layer; mold casting the rear surface of the primer coated metal layer and (back) filling the module opening and slit with a low viscosity thermosetting resin (TR); allowing the thermosetting resin to cure (harden); machining the fully cured thermosetting resin to a defined thickness (e.g. 50 µm); removing the sacrificial layer; priming the front surface of the bottom metal layer with an undercoating liquid for inkjet printing (comprising an aliphatic monomer, acrylic oligomer, aromatic monomer, photo-initiator and additives), acrylic base or an acrylic clear powder followed by drying in an oven before digital inkjet printing; inkjet printing graphic elements to the front surface of the bottom metal layer (BML); applying an adhesive layer to the printed artwork; laminating a protective overlay film (laser engravable) with magnetic stripe to the adhesive coated printed artwork on the front face of the bottom metal layer; applying a layer of primer to the cured thermosetting resin on the top and bottom metal layers and laminating the two assemblies together; and from the front surface of the top metal layer, milling a cavity in the thermosetting resin coated atop with primer and digital ink for receiving a transponder chip module (TCM). A chip module may be implanted in the milled-out cavity, wherein the thermosetting resin provides mechanical support to the chip module and electrical insulation of the chip module from the metal layer. The metal transaction card may be "dual-interface".

According to the invention, generally, a method of making a metal transaction card may comprise: providing a top metal layer (TML) having a laser-cut module opening (MO) and a slit (S) extending from a front surface of the top metal layer to a rear surface thereof, passivating the top metal layer after laser-cutting and ultrasonic cleaning; depositing an adhesion promoter (AP) in the form of a primer to the rear surface of the top metal layer and allowing the primer to dry under the application of temperature; providing a sacrificial layer (SL) on the front surface of the top metal layer; casting the rear surface of the primer coated metal layer and (back) filling the module opening and slit with a low viscosity thermosetting resin (TR); allowing the thermosetting resin to cure (harden); machining the fully cured thermosetting resin to a defined thickness (e.g. 50 µm); removing the sacrificial layer; pretreating the front surface of the top metal layer (TML) to promote coating adhesion (e.g. using an acrylic clear powder as primer) followed by the dry-off stage in an oven before thermoplastic or thermoset powder coating; applying a powder top coat in a down-draft powder spray booth follow by curing; mechanically engraving and laser etching graphic elements into the powder coat; digitally printing features onto the powder coating; providing a bottom metal layer (BML) having a laser-cut module opening (MO) and a slit (S) extending from a front surface (face-down side) of the bottom metal layer to a rear surface thereof; passivating the bottom metal layer after laser-cutting and ultrasonic cleaning; depositing a primer to the rear surface of the bottom metal layer and allowing the primer to dry in an oven; providing a sacrificial layer (SL) on the front surface of the bottom metal layer; casting the rear surface of the primer coated metal layer and (back) filling the module opening and slit with a low viscosity thermosetting resin (TR); allowing the thermosetting resin to cure (harden); machining the fully cured thermosetting resin to a defined thickness (e.g. 50 µm); removing the sacrificial layer; priming the front surface of the bottom metal layer with an undercoating liquid for inkjet printing (comprising an aliphatic monomer, acrylic oligomer, aromatic monomer, photo-initiator and additives), acrylic base or an acrylic clear powder followed by drying in an oven before digital inkjet printing; inkjet printing graphic elements to the front surface of the bottom metal layer (BML); applying a layer of primer to the cured thermosetting resin on the top and bottom metal layers and laminating the two assemblies together; and from the front surface of the top metal layer, milling a cavity in the powder coated thermosetting resin for receiving a transponder chip module (TCM). A chip module may be implanted in the milled-out cavity, wherein the thermosetting resin provides mechanical support to the chip module and electrical insulation of the chip module from the metal layer. The metal transaction card may be "dual-interface".

The top metal layer may be first coated with either a clear acrylic or a polyester powder primer supplied by Akzo Nobel. A typical metal layer primer coat ranges from 1.5 (38 µm) to 2.0 (51 µm) mils while a typical top coat ranges from 2.0 (51 µm) to 3.5 (89 µm) mils.

According to the invention, generally, a method of making a metal transaction card may comprise: providing a top metal layer (TML) having a laser-cut module opening (MO) and a slit (S) extending from a front surface of the top metal layer to a rear surface thereof, passivating the top metal layer after laser-cutting and ultrasonic cleaning; depositing an adhesion promoter (AP) in the form of a primer to the rear surface of the top metal layer and allowing the primer to dry under the application of temperature; providing a sacrificial layer (SL) on the front surface of the top metal layer; casting the rear surface of the primer coated metal layer and (back) filling the module opening and slit with a low viscosity thermosetting resin (TR); allowing the thermosetting resin to cure (harden); machining the fully cured thermosetting resin to a defined thickness (e.g. 50 µm); removing the sacrificial layer; pretreating the front surface of the top metal layer (TML) to promote coating adhesion (e.g. using an acrylic clear powder as primer) followed by the dry-off stage in an oven before thermoplastic or thermoset powder coating; applying a powder top coat in a down-draft powder spray booth follow by curing; mechanically engraving and laser etching graphic elements into the powder coat; digitally printing features onto the powder coating; providing a bottom metal layer (BML) having a laser-cut module opening (MO) and a slit (S) extending from a front surface (face-down side) of the bottom metal layer to a rear surface thereof; passivating the bottom metal layer after laser-cutting and ultrasonic cleaning; depositing a primer to the rear surface of the bottom metal layer and allowing the primer to dry in an oven; providing a sacrificial layer (SL) on the front surface of the bottom metal layer; casting the rear surface of the primer coated metal layer and (back) filling the module opening and slit with a low viscosity thermosetting resin (TR); allowing the thermosetting resin to cure (harden); machining the fully cured thermosetting resin to a defined thickness (e.g. 50 µm); removing the sacrificial layer; pretreating the front surface of the bottom metal layer (TML) to promote coating adhesion (e.g. using an acrylic clear powder as primer) followed by the dry-off stage in an oven before thermoplastic or thermoset powder coating; applying a powder top coat in a down-draft powder spray booth follow by curing; digitally printing features onto the powder coating; applying a layer of primer to the cured thermosetting resin on the top and bottom metal layers and laminating the two assemblies together; and from the front surface of the top metal layer, milling a cavity in the powder coated thermosetting resin for receiving a transponder chip module (TCM). A chip module may be implanted in the milled-out cavity, wherein the thermosetting resin provides mechanical support to the chip module and electrical insulation of the chip module from the metal layer. The metal transaction card may be "dual-interface".

According to the invention, generally, a metal transaction card (or smartcard) may be formed as follows. Encapsulating the rear side of a top metal layer of the card with a thermosetting resin whilst filling any laser-cut module openings, slits, or void sections therein, applying a primer to the front side of the top metal layer and drying in an oven before spraying a thermoset powder coating thereon, laser etching and mechanically engraving graphic elements into the powder coating to reveal the bare metal surface, inkjet printing graphic features to the powder coat. Encapsulating the rear side of a bottom metal layer of the card with a thermosetting resin whilst filling any laser-cut module openings, slits, or void sections therein, applying a primer to the rear side of the bottom metal layer and drying in an oven before digitally printing artwork, applying a protective overlay layer with magnetic stripe to the printed graphics, applying a primer or an adhesive film to the thermosetting to enable lamination of the top metal layer to the bottom metal layer. A cavity may be milled in the powder coated thermosetting resin(s) in the module opening(s) and a transponder chip module (flip chip or wire bonded module) may be implanted in the milled cavity for inductive coupling with the metal layer(s). The card may function at least contactlessly, and may also have a contact interface (contact pads on its front or top surface) for "dual-interface" capability.

According to the invention, generally, a method of making a transaction card may comprise encapsulating the rear side of a top metal layer of a metal transaction card with a thermosetting resin whilst filling any laser-cut module openings, slits, or void sections therein, applying a primer to the front side of the top metal layer and drying in an oven before spraying a thermoset powder coating thereon, laser etching and mechanically engraving graphic elements into the powder coating to reveal the bare metal surface, inkjet printing graphic features to the powder coat. The method may further comprise encapsulating the rear side of a bottom metal layer of the card with a thermosetting resin whilst filling any laser-cut module openings, slits, or void sections therein, applying a primer to the rear side of the bottom metal layer and drying in an oven before digitally printing artwork, applying a protective overlay layer with magnetic stripe to the printed graphics, applying a primer or an adhesive film to the thermosetting to enable lamination of the top metal layer to the bottom metal layer. The method may further comprise milling a cavity in the powder coated thermosetting resin(s) in the module opening(s) and implanting a transponder chip module (flip chip or wire bonded module) in the cavity for inductive coupling with the metal layer(s).

According to an embodiment of the invention, a method of manufacturing a smartcard (SC) having at least contactless capability may comprise: providing a first metal layer (ML) having a front side, a rear side, a module opening (MO) and a slit (S); and coating the rear side of the first metal layer and filling the module opening and slit with a thermosetting resin (TR). The thermosetting resin may comprise polyurethane (PU). The first metal layer may form a front face metal layer (FML) of a smartcard or transaction card. The smartcard may be dual interface, also having contact capability.

Prior to coating the rear side of the first metal layer, a sacrificial layer may be disposed on the front side of the metal layer. The sacrificial layer may be selected from the group consisting of polytetrafluoroethylene (PTFE, Teflon®), polyolefin backing film, a protective release film with low tack adhesive, polyethylene film tape and plasticized PVC film.

After coating the rear side of the first metal layer, and the thermosetting resin is sufficiently cured to remain in the module opening, the sacrificial layer may be removed, and a primer may be applied to the front side of the first metal layer. After applying the primer to the front side of the first metal layer, a decorative coating of ink or thermoset powder may be applied to cover the front surface of the first metal layer and camouflage the slit. Before applying the decorative coating, the primer may be allowed to dry. After applying the decorative coating, raised characters or graphic features may be formed on the decorative coating. After applying the decorative coating, the decorative coating may be engraved. After applying the decorative coating, and before or after forming the raised characters or graphic features, the decorative coating may be engraved using a process selected from the group consisting of mechanical or laser engraving.

The smartcard may further comprise: a discontinuous second metal layer (ML, DML, RML) having a front side, a rear side, a module opening (MO) and a slit (S), which may be disposed below the first metal layer; and the second metal layer may be encapsulated with a thermosetting resin to mechanically support the first metal layer.

A primer may be applied to the rear side of the second metal layer; and after applying the primer to the rear side of the second metal layer, a decorative coating of ink or thermoset powder may be applied to cover the rear surface of the second metal layer and camouflage the slit.

An adhesive layer (AL) or an inter-coat layer may be provided between the encapsulated first metal layer and the encapsulated second metal layer; and the second metal layer may be joined to the first metal layer by way of press lamination.

According to an embodiment of the invention, a metal transaction card may comprise: a discontinuous top metal layer (DML, TML) having a top surface, a bottom surface, a module opening and a slit, wherein the top metal layer is encapsulated with thermosetting resin while leaving the top surface exposed; a layer of primer coating the exposed top surface of the top metal layer; and digital ink or thermoset powder deposited on the primer to camouflage the slit. The thermosetting resin may comprise polyurethane.

The metal transaction card may further comprise: a discontinuous bottom metal layer (DML, BML) having a front surface, a rear surface, a module opening (MO) and a slit (S), wherein the bottom metal layer is disposed below the top metal layer; wherein the bottom metal layer is encapsulated with thermosetting resin to support the top metal layer.

An adhesive layer (AL) or an inter-coat layer may be disposed between the encapsulated top metal layer and the encapsulated bottom layer.

Primer may be disposed on the rear surface of the bottom metal layer; and a decorative coating of ink or thermoset powder may be disposed covering the rear surface of the second metal layer.

The transponder chip module may be implanted in the module opening(s) of the smartcard.

As described in Ser. No. 17,952,253 filed 24 Sep. 2022 (refer to FIG. 6C therein), incorporated by reference herein, the module openings which are filled with thermosetting resin may be milled out to accept insertion of a transponder chip module into the card (or card body). The transponder chip module may have an upper larger ("P1") portion and a lower smaller ("P2") portion. The transponder chip module may be a dual-interface module having both contact and contactless capability (functionality), and may be referred to as a dual interface module.

The transponder chip module may be inserted into the module openings in the metal layers, as follows. The module opening in the first (or top) metal layer may be sized to accept the upper larger ("P1") portion of the module. The module opening in the second (or bottom) metal layer may be sized to accept the lower smaller ("P2") portion of the module. The module opening in the first (or top) metal layer may be aligned atop the module opening in the second (or bottom) metal layer. The module openings in the first (or top) and second (or bottom) metal layers may be slightly larger than the respective "P1" and "P2" portions of the module inserted therein. Advantageously, there may result in there being a separation channel of approximately 0.25 mm between edges of the module openings in the metal layers and corresponding portions of the module implanted therein, resulting in residual (leftover, not milled out) portions of the thermosetting resin in the module openings surrounding the module, and insulating the module from the metal layers.

In an embodiment of the invention, a metal transaction card may comprise a front face metal layer having a highly polished and or matte finish disposed with mechanically engraved and or laser etched features, plated with precious metal, a PVD coating or a DLC coating, and protected by an insulating layer of transparent electrophoretic painting or ultraviolet curing ink.

In another embodiment of the invention, the front face metal layer may be disposed with a thermoset polymeric coating, a pre-metallization leveling layer, followed by a PVD coated thin film metal layer protected by a thermoset polymeric coating.

In a further embodiment of the invention, the front face metal layer may be disposed with a coating of cured UV ink, followed by a powder coating and protected by a cured UV ink layer. The front face metal layer may be continuous or discontinuous having a slit stepped filled for reinforcement.

In an embodiment of the invention, a discontinuous metal layer functioning as a coupling frame with a filled slit is disposed with an insulating layer, a pre-metallization leveling layer, a thin film PVD metal layer and protected by an insulating layer, wherein the thin film PVD metal layer is electromagnetic transparent allowing for contactless communication.

In their various embodiments, the invention(s) described herein may relate to industrial and commercial industries, such RFID applications, payment smartcards (metal, plastic or a combination thereof), electronic credentials, identity cards, loyalty cards, access control cards, and the like.

Other objects, features and advantages of the invention(s) disclosed herein may become apparent in light of the following illustrations and descriptions thereof.

BRIEF DESCRIPTION OF THE DRAWINGS

Reference will be made in detail to embodiments of the disclosure, non-limiting examples of which may be illustrated in the accompanying drawing figures (FIGS.). The figures may generally be in the form of diagrams. Some elements in the figures may be stylized, simplified or exaggerated, others may be omitted, for illustrative clarity.

Although the invention is generally described in the context of various exemplary embodiments, it should be understood that it is not intended to limit the invention to these particular embodiments, and individual features of various embodiments may be combined with one another. Any text (legends, notes, reference numerals and the like) appearing on the drawings are incorporated by reference herein.

Some elements may be referred to with letters ("AS", "CBR", "CF", "MA", "MT", "TCM", etc.) rather than or in addition to numerals. Some similar (including substantially identical) elements in various embodiments may be similarly numbered, with a given numeral such as "310", followed by different letters such as "A", "B", "C", etc. (resulting in "310A", "310B", "310C"), and may collectively (all of them at once) referred to simply by the numeral ("310").

Figure 1:

FIG. 1 is a highly simplified isometric diagram of the front face layering of a metal transaction card with a protective electro-coating, according to an embodiment of the invention.

Figure 2:

FIG. 2 is a modified diagram of FIG. 1 illustrating the front face layering of a metal transaction card with gold or platinum plating of underlying mechanically engraved and or laser etched features with the plated surface protected by an electro-coating, according to an embodiment of the invention.

Figure 3:
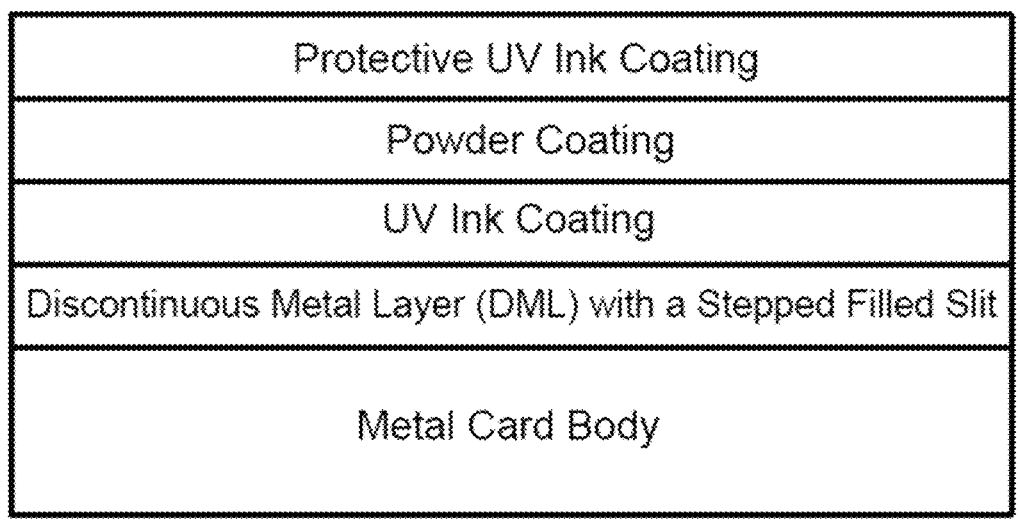

FIG. 3 is an isometric diagram of the front face layering of a metal transaction card with powder coating protected by UV ink, according to an embodiment of the invention.

Figure 4:
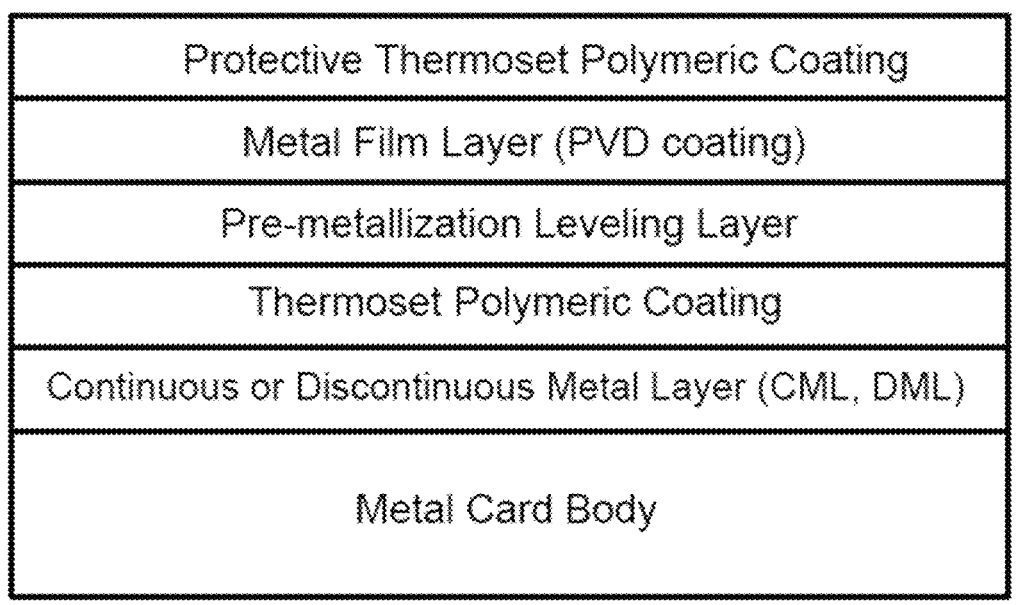

FIG. 4 is an isometric diagram of the front face layering of a metal transaction card with PVD metallization, according to an embodiment of the invention.

Figure 5A:
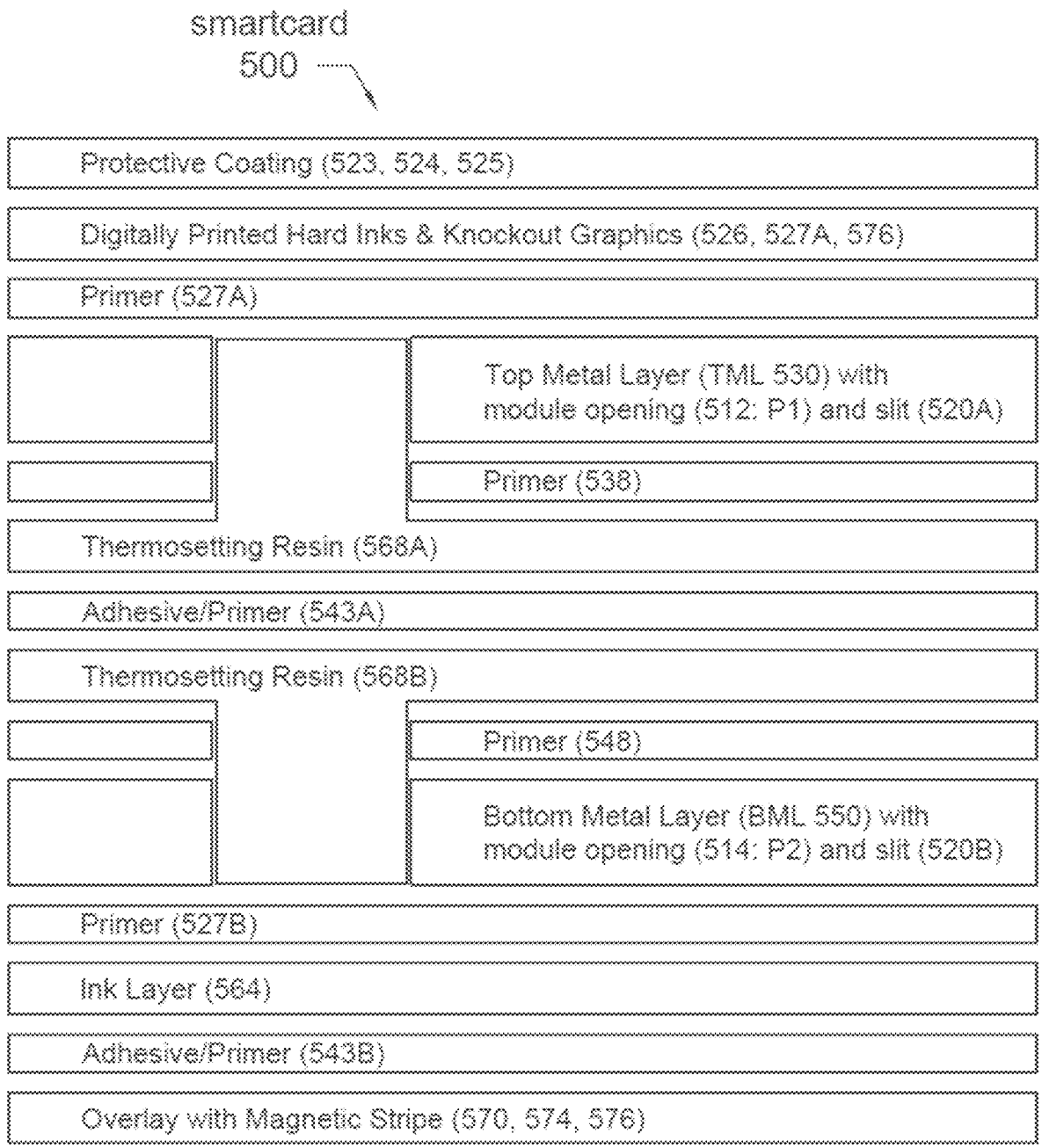

FIG. 5A is an exploded cross-sectional view (not to scale) of a metal transaction card having a top and bottom metal layer encapsulated with thermosetting resin, with digital ink deposited on each exposed metal surface coated with a layer of primer to camouflage the presence of a discontinuity in the metal layers, according to an embodiment of the invention.

Figure 5B:
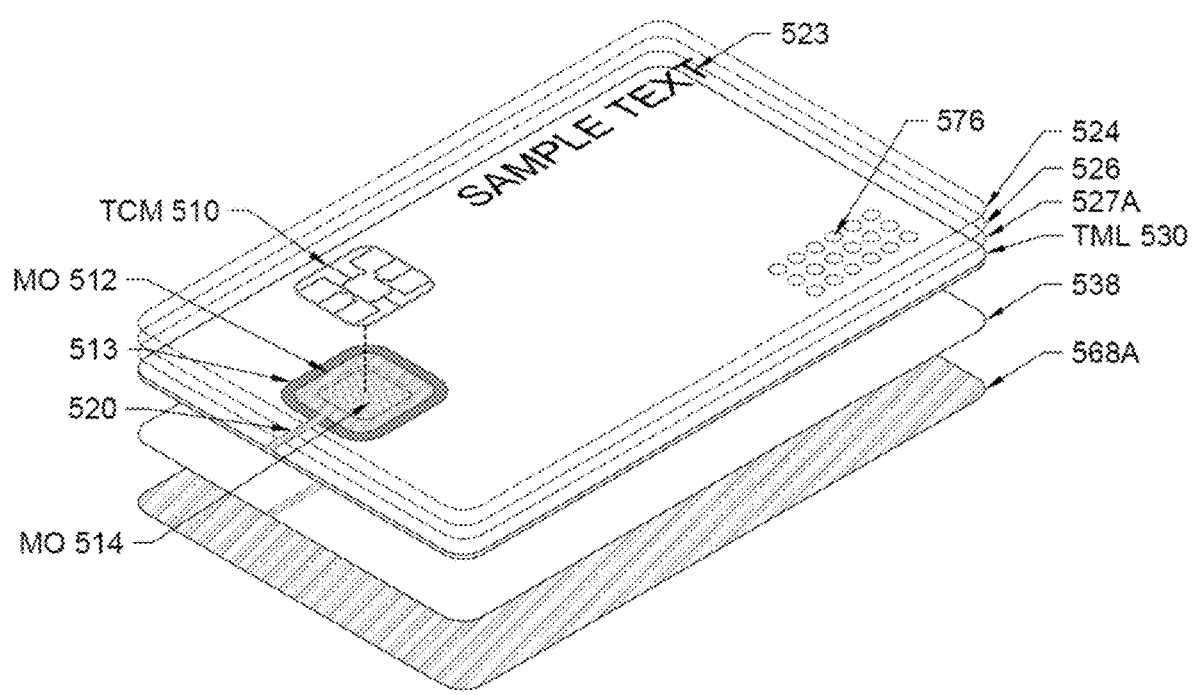

FIG. 5B is a diagram (exploded, perspective view) of a metal transaction card showing different layers in the stack-up construction, according to an embodiment of the invention.

Figure 6:
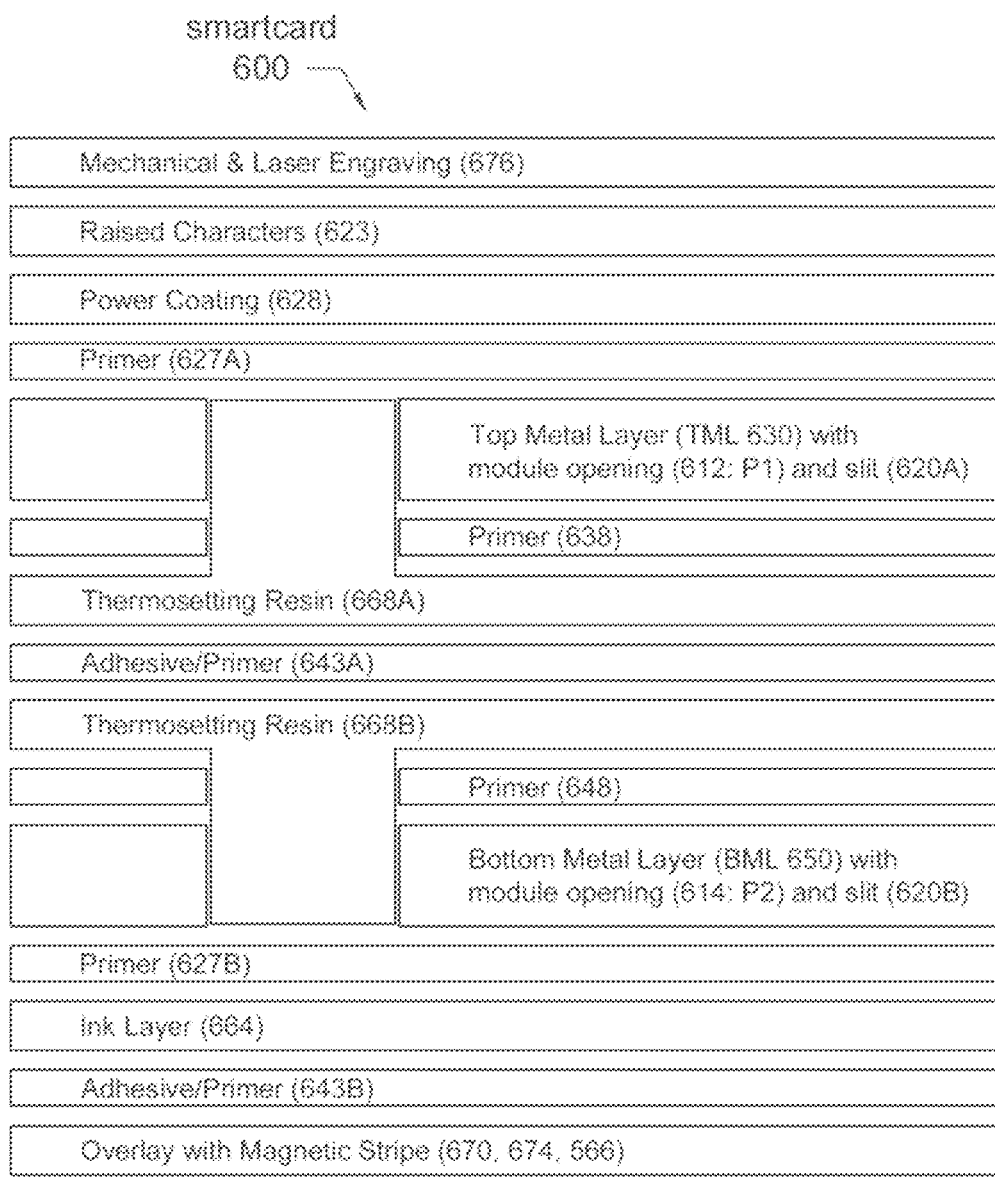

FIG. 6 is an exploded cross-sectional view (not to scale) of a metal transaction card having a top and bottom metal layer encapsulated with thermosetting resin, with a powder coat deposited on the top metal surface coated with a layer of primer to camouflage the presence of a discontinuity in the top metal layer, and with digital ink deposited on the bottom metal surface coated with a layer of primer to camouflage the presence of a discontinuity in the bottom metal layer, according to an embodiment of the invention.

Figure 7:
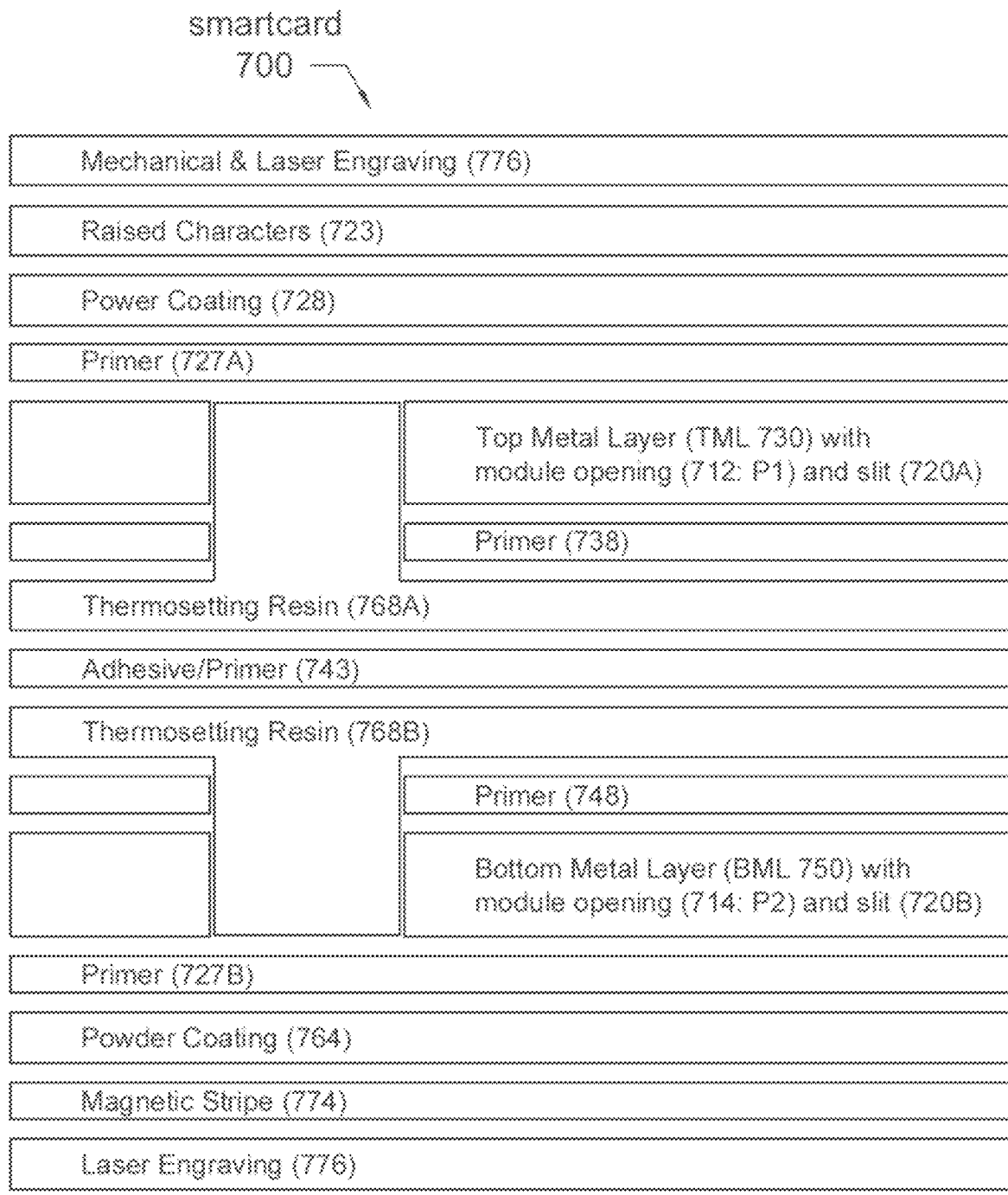

FIG. 7 is an exploded cross-sectional view (not to scale) of a metal transaction card having a top and bottom metal layer encapsulated with thermosetting resin, with a powder coat deposited on the top metal surface coated with a layer of primer to camouflage the presence of a discontinuity in the top metal layer, and with a powder coat deposited on the bottom metal surface coated with a layer of primer to camouflage the presence of a discontinuity in the bottom metal layer, according to an embodiment of the invention.

Figure 8:
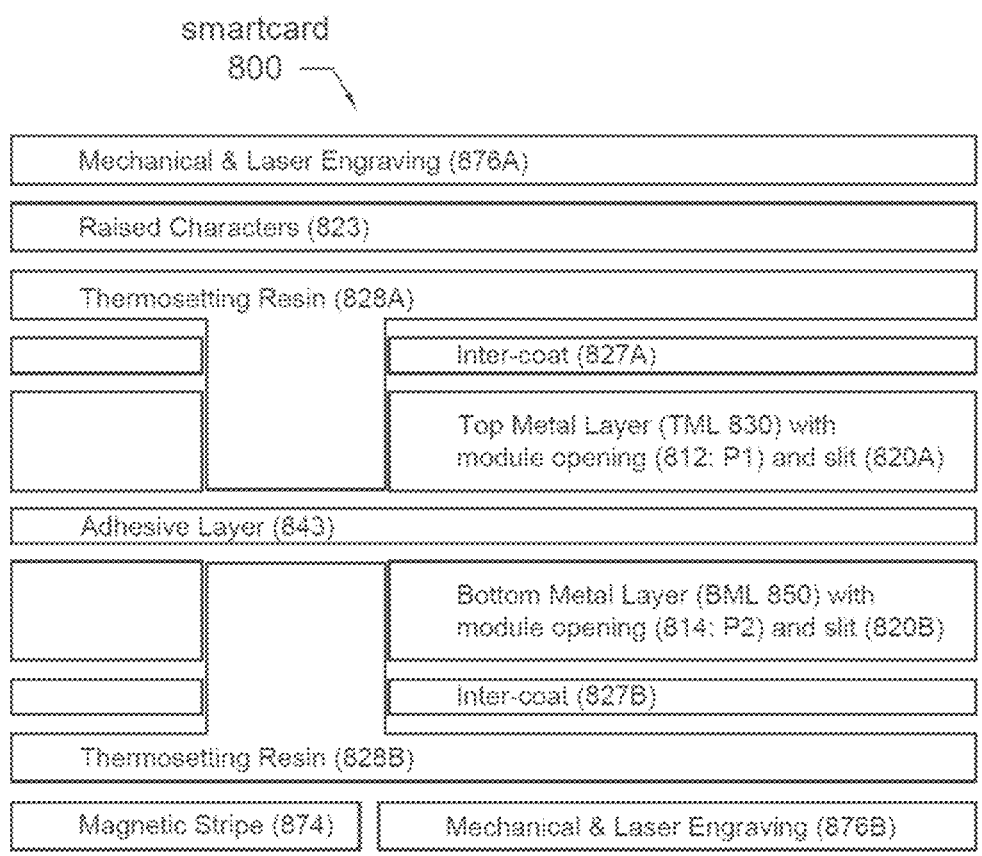

FIG. 8 is an exploded cross-sectional view (not to scale) of a metal transaction card having a top and bottom metal layer, and a thermosetting resin coat deposited on the top metal surface coated with a layer of primer to camouflage the presence of a discontinuity in the top metal layer, and with a thermosetting resin coat deposited on the bottom metal surface coated with a layer of primer to camouflage the presence of a discontinuity in the bottom metal layer, according to an embodiment of the invention.

DESCRIPTION

Various embodiments (or examples) may be described to illustrate teachings of the invention(s), and should be construed as illustrative rather than limiting. It should be understood that it is not intended to limit the invention(s) to these particular embodiments. It should be understood that some individual features of various embodiments may be combined in different ways than shown, with one another. Reference herein to "one embodiment", "an embodiment", or similar formulations, may mean that a particular feature, structure, operation, or characteristic described in connection with the embodiment is included in at least one embodiment of the present invention. Some embodiments may not be explicitly designated as such ("an embodiment").

The embodiments and aspects thereof may be described and illustrated in conjunction with systems, devices and methods which are meant to be exemplary and illustrative, not limiting in scope. Specific configurations and details may be set forth in order to provide an understanding of the invention(s). However, it should be apparent to one skilled in the art that the invention(s) may be practiced without some of the specific details being presented herein. Furthermore, some well-known steps or components may be described only generally, or even omitted, for the sake of illustrative clarity. Elements referred to in the singular (e.g., "a widget") may be interpreted to include the possibility of plural instances of the element (e.g., "at least one widget"), unless explicitly otherwise stated (e.g., "one and only one widget").

In the following descriptions, some specific details may be set forth in order to provide an understanding of the invention(s) disclosed herein. It should be apparent to those skilled in the art that these invention(s) may be practiced without these specific details. Any dimensions and materials or processes set forth herein should be considered to be approximate and exemplary, unless otherwise indicated. Headings (typically underlined) may be provided as an aid to the reader, and should not be construed as limiting.

Reference may be made to disclosures of prior patents, publications and applications. Some text and drawings from those sources may be presented herein, but may be modified, edited or commented to blend more smoothly with the disclosure of the present application.

FIG. 1 is a highly simplified isometric diagram of the front face layering of a metal transaction card with a protective electro-coating, comprising of a highly polished continuous metal layer (CML) of stainless steel on the front face of a metal card body with mechanically engraved and or laser etched features and its machined surface protected by an e-coat.

FIG. 2 is a modified diagram of FIG. 1 illustrating the front face layering of a metal transaction card with gold or platinum plating of underlying mechanically engraved and or laser etched features with the plated surface protected by an electro-coating. The plating can be pre or post machining of the features.

FIG. 2 illustrates the front face layering of a metal transaction card comprising of a highly polished continuous metal layer (CML) of stainless steel on the front face of a metal card body with mechanically engraved and or laser etched features, with the machined surface plated with gold or platinum, PVD coated or DLC coated, and followed by an e-coat to protect the plated or coated surface from scratches. The e-coat is an electrically insulated layer on the surface of the plated or coated metal.

FIG. 3 is an isometric diagram of the front face layering of a metal transaction card with powder coating protected by UV ink. The discontinuous metal layer with a stepped filled slit is screen printed with a coating of UV ink, followed by a powder coating which is further protected by a UV curing ink.

FIG. 4 is an isometric diagram of the front face layering of a metal transaction card with PVD metallization. The surface of a continuous or discontinuous metal layer (CML, DML) on the front face of a metal card body is provided with a thermoset polymeric coating, followed by a pre-metallization leveling layer before depositing a metal film layer by means of a PVD coating process, and further protected by a thermoset polymeric coating.

Method for Two Dimensional (2D) Image Conversion to Three Dimensional (3D) for the Purpose of Machining Elements and Features in a Metal Layer of a Metal Transaction Card Most two-dimensional image files of artwork for graphic card designs, typically in a portable document format (pdf) or adobe illustrator (ai) can be viewed and edited in the software package "Illustrator". There is a slightly different initial process to get the tool paths from a bitmap/raster image (joint photographic experts group (jpg)) than from a vector image (pdf, ai).

Vector Image (Illustrator)

Some file types, like pdf, can retain layer and line information (vectors) of the artwork and are editable in illustrator. In these cases, the 3D designer must manually go through each element in the artwork to edit the vectors and ensure the design meets the requirements for the machining i.e. tool shape versus 3D profile compatibility.

Depending on how the original artist constructed the vector image, the image will also need to be checked for hidden or duplicate layers within the vectors. Typically for milling or engraving, all the 2D vectors must form closed shapes. Once this has been done the file can be exported as an AutoCad file (Drawing Interchange Format (DXF), Drawing Format (DWG)).

Bitmap/Raster Image (Illustrator)

These file types retain no layer or vector information. So the 3D designer must manually create vectors for the outlines (vectors) of each separate color or boundary areas, forming closed shapes. Once all objects are re-drawn as closed vectors, they can be exported as an AutoCAD file.

2D Line Optimization (AutoCAD)

The exported AutoCAD files are then optimized for the 3D software and post processor. Certain line types (i.e. splines) are not compatible with all software, so each vector must be converted into polylines or arcs. The 3D designer must then be able to arrange/edit these shapes so that the topological features are compatible with the 3D software or post/processor. The exact techniques (line-art/profiling/dotting/texturing) used to represent an image or topology will often depend on the image and complexity of the design itself and also the manufacturing process used to create it, cutting or engraving with laser or CNC machining.

3D Model (Inventor)

Using the tools within Inventor and careful 2D design, the 3D designer is able to render the 2D vectors into a 3D model of the design. For complex or large designs, this will require a high-spec computer to be able to render and process the model. Inventor has basic tools for post-processing on a wide range of machines, but often for industrial uses, individual machines will have their own post processor. In this case, Inventor can export a range of standard machine codes (i.e. g-code) or 3D model files (i.e. stl) that can be read by the post processor.

G-Code (Geometric Code)

G-code (Geometric Code) is a programming language for CNC (Computer Numerical Control) machines and STL (Standard Triangle Language or Standard Tessellation Language) is a file format native to the stereolithography CAD software created by 3D Systems.

Post Processor (Cagila)

Cagila is a post processor for the ACSYS laser system, but it is similar in function to most other types of post processor. It contains advanced level of settings and configurations for optimizing all aspects of the machining. Vector and model files for the post processor have to be carefully designed, as a lot of the software's functions require the vectors and shapes to meet certain criteria to be machinable. Artefacts or duplicate lines can cause errors, and are often difficult to detect and fix within the software. Meaning the file might need to be fixed in AutoCAD or Inventor. Results and ease of use can vary widely depending on the quality of the software.

Automatic Method (MasterCAM 2022 ART)

This program offers automatic 2D image scanning and 3D profiling, but complex or more 'artistic' designs may still need considerable manual adjustment to accurately represent the intended design.

Software packages used for the 2D/3D conversion include: Adobe Illustrator; Autodesk AutoCAD; Autodesk Inventor; CNC/Laser post processor (i.e ACSYS Cagila); and MasterCAM 2022 ART.

In mechanically engraving a 3D ornamental feature of delicate or intricate design into a metal layer such as stainless steel, running dry or using a lubricant (e.g. mineral oil), typically an ultrafine tool (e.g. Ø 380 μm, 2 or 4 flute ball end mill) is used for precision machining. The graphic artwork in a DXF file is arranged against a solid model, with the depth of engraving set into the solid background. CAM software such as Autodesk Fusion 360 converts the file into a language (e.g. G or M code) the CNC milling machine understands, to run the ball mill to obtain the desired design. The limitation of the engraving process is the use of a fragile tool with a short tool life in machining at high feeds and speeds (40 inches per minute at 24,000 rpm).

FIG. 5A is an exploded cross-sectional view (not to scale) of a metal transaction card 500 having a top or front metal layer and bottom or rear metal layer encapsulated with thermosetting resin, with digital ink deposited on each exposed metal surface coated with a layer of primer to camouflage the presence of a discontinuity in the metal layers, according to an embodiment of the invention.

The construction of the metal transaction card 500 comprises a number of layers. The stack-up (construction) of the smartcard is now described. Generally, the layers may be described starting with a front face metal layer with slit, and working both up (towards the front face of the card) and down (towards the rear face of the card) therefrom. Some details, which have already been described elsewhere, may be omitted from this description, for the sake of brevity. For descriptive purposes each layer may have a front surface and a rear surface.

500 smartcard (SC) or metal transaction card
  510 transponder chip module/inductive coupling chip module (TCM/ICM)
  511 module antenna (MA)
  523 raised characters—post lamination varnish (PLV)
  524 laser reactive, protective gloss or matte coating
  525 a transparent coat of rigid ink (hard coat) for scratch protection applied over the graphic print layer (526), such as by means of digital printing
  526 graphic print layer—deposited ink (color)—knockout to metal
  527A deposited acrylic base primer
  576 laser markings on the protective coating (524)

Alternative Option

528 thermoset powder coating (top coat) on an acrylic clear powder (primer), PVD or DLC coating replacing the deposited primer (527), graphic print layer (526) and the transparent hard coat (525)
  530 top or front metal layer (ML, TML, FML), which may be a front face discontinuous metal layer (DML) having a front side, a rear side, a laser-cut module opening (MO: 512) with metal edges (513) and a slit (520A)—thickness of the top metal layer: 304 μm stainless steel (12 mils)
  512 laser-cut module opening (MO: $P_1$)
  513 metal edges around the laser-cut module opening (MO: 512)
  520A slit in the top metal layer/front face discontinuous metal layer (DML: 530)
  538 inter-coat (an adhesion promoter in the form of a primer or an adhesive coating) applied to the rear side surface of the top metal layer/front face discontinuous metal layer (DML: 530)—thickness of the inter-coat: 10 μm
  568A a layer of transparent thermosetting resin (polyurethane) encapsulating the rear side of the top metal layer/front face discontinuous metal layer (DML: 530) filling the laser-cut module opening (MO: 512) and the slit (S: 520A) with resin—thickness of the thermosetting resin: 40 μm
  543A adhesive layer (AL), a thermosetting adhesive film layer (AL) joining by way of press lamination the top metal layer subassembly to the bottom metal layer subassembly, an inter-coat layer (10 μm) may replace the adhesive layer (25 μm)—thickness of the adhesive layer (AL): 25 μm
  550 bottom or rear metal layer (ML, BML, RML), which may be a supporting discontinuous metal layer (D-L), having a front side, a rear side, a laser-cut module opening (MO: 514) and a slit (S: 520B)—thickness of the bottom or rear metal layer: 304 μm stainless steel (12 mils)
  514 laser-cut module opening (MO: $P_2$)
  516 metal edges around the laser-cut module opening (MO: 514)
  520B slit in the rear discontinuous metal layer (DML: 550)

548 inter-coat (an adhesion promoter in the form of a primer or an adhesive coating) applied to the rear surface (face-up side) of the bottom metal layer/supporting discontinuous metal layer (DML: 550)—thickness of the inter-coat: 10 µm 568B a layer of thermosetting resin encapsulating the rear side surface of the bottom metal layer/supporting discontinuous metal layer (DML: 550) filling the laser-cut module opening (MO: 514) and the slit (S: 520) with resin—thickness of the thermosetting resin: 40 µm 527B deposited acrylic base primer 564 inkjet printing of graphics to the bottom metal layer coated with primer 543B adhesive layer (AL), a thermosetting or thermoplastic adhesive film layer (AL), an inter-coat layer (10 µm) may replace the adhesive layer (25 µm)—thickness of the adhesive layer (AL): 25 µm 570 overlay layer (OL), laser engravable, which functions as a protective film—thickness of the overlay layer: 60 µm 574 magnetic stripe mounted to the rear overlay layer (570)

576 laser markings on the protective film (570)

FIG. 5B is a diagram (exploded, perspective view) of the metal transaction card 500 ion FIG. 5A showing different layers in the stack-up construction.

The construction of the metal transaction card shown in FIG. 5B has been briefly described hereinabove, and comprises of the following layers:

510 transponder chip module/inductive coupling chip module (TCM/ICM)

512 laser-cut module opening (MO: P$_1$)

513 metal edges around the laser-cut module opening (MO: 512)

520 slit in the top metal layer/front face discontinuous metal layer (DML: 530)

514 laser-cut module opening (MO: P$_2$)

523 raised characters—post lamination varnish (PLV)

576 laser markings on the protective coating (524)

524 laser reactive, protective gloss or matte coating 526 graphic print layer—deposited ink (color)—knockout to metal 527A deposited acrylic base primer 530 top or front metal layer (ML, TML, FML), which may be a front face discontinuous metal layer (DML) having a front side, a rear side, a laser-cut module opening (MO: 512) with metal edges (513) and a slit (520A)—thickness of the top metal layer: 304 µm stainless steel (12 mils)

538 inter-coat (an adhesion promoter in the form of a primer or an adhesive coating) applied to the rear side surface of the top metal layer/front face discontinuous metal layer (DML: 530)—thickness of the inter-coat: 10 µm 568A a layer of transparent thermosetting resin (polyurethane) encapsulating the rear side of the top metal layer/front face discontinuous metal layer (DML: 530) filling the laser-cut module opening (MO: 512) and the slit (S: 520A) with resin—thickness of the thermosetting resin: 40 µm FIG. 5B illustrates a top metal layer with a module opening and slit back-filled from the rear side with thermosetting resin and allowed to fully cure. In a subsequent step, the front surface of the top metal layer is disposed with an acrylic base primer covering the entire surface area including the resin filled module opening and slit. The primer is applied at least once by spraying or screen printing and allow to cure in an oven. The thickness of the primer layer (25 µm-50 µm) helps to camouflage the existence of the slit. In a further process step, digital ink (25 µm) or a powder coating (50-75 µm) is applied to the cured primer. The module antenna of the transponder chip module does not inductively couple with the top metal layer but rather with the underlying bottom metal layer.

FIG. 6 is an exploded cross-sectional view (not to scale) of a metal transaction card having a top and bottom metal layer encapsulated with thermosetting resin, with a powder coat deposited on the top metal surface coated with a layer of primer to camouflage the presence of a discontinuity in the top metal layer, and with digital ink deposited on the bottom metal surface coated with a layer of primer to camouflage the presence of a discontinuity in the bottom metal layer.

The construction of the metal transaction card 600 has been briefly described hereinabove, and comprises of the following layers:

600 smartcard (SC) or metal transaction card 610 transponder chip module/inductive coupling chip module (TCM/ICM)

611 module antenna (MA)

676 mechanical engraving and laser etching of graphic elements 623 raised characters (inkjet printed hard ink) or graphic features—post lamination varnish (PLV)

628 thermoset powder coating 627A deposited acrylic clear powder (primer)

630 top or front metal layer (ML, TML, FML), which may be a front face discontinuous metal layer (DML) having a front side, a rear side, a laser-cut module opening (MO: 612) with metal edges (613) and a slit (620A)—thickness of the top metal layer: 304 µm stainless steel (12 mils)

612 laser-cut module opening (MO: P$_1$)

613 metal edges around the laser-cut module opening (MO: 612)

620A slit in the top metal layer/front face discontinuous metal layer (DML: 630)

638 inter-coat (an adhesion promoter in the form of a primer or an adhesive coating) applied to the rear side surface of the top metal layer/front face discontinuous metal layer (DML: 630)—thickness of the inter-coat: 10 µm 668A a layer of transparent thermosetting resin (polyurethane) encapsulating the rear side of the top metal layer/front face discontinuous metal layer (DML: 630) filling the laser-cut module opening (MO: 612) and the slit (S: 620A) with resin—thickness of the thermosetting resin: 40 µm 643A adhesive layer (AL), a thermosetting adhesive film layer (AL) joining by way of press lamination the top metal layer subassembly to the bottom metal layer subassembly, an inter-coat layer (10 µm) may replace the adhesive layer (25 µm)—thickness of the adhesive layer (AL): 25 µm 650 bottom or rear metal layer (ML, BML, RML), which may be a supporting discontinuous metal layer (DML) having a front side, a rear side, a laser-cut module opening (MO: 614) and a slit (S: 620B)—thickness of the bottom metal layer: 304 µm stainless steel (12 mils)

614 laser-cut module opening (MO: P$_2$)

616 metal edges around the laser-cut module opening (MO: 614)

620B slit in the rear discontinuous metal layer (DML: 650)

648 inter-coat (an adhesion promoter in the form of a primer or an adhesive coating) applied to the rear surface (face-up side) of the bottom metal layer/supporting discontinuous metal layer (DML: 650)—thickness of the inter-coat: 10 µm 668B a layer of thermosetting resin encapsulating the rear side surface of the bottom metal layer/supporting discontinuous metal layer (DML: 650) filling the laser-cut module opening (MO: 614) and the slit (S: 620) with resin—thickness of the thermosetting resin: 40 µm 627B deposited acrylic base primer, acrylic clear powder or a standard primer for digital ink

664 inkjet printing of graphics to the bottom metal layer coated with primer 643B adhesive layer (AL), a thermosetting or thermoplastic adhesive film layer (AL), an inter-coat layer (10 µm) may replace the adhesive layer (25 µm)—thickness of the adhesive layer (AL): 25 µm

670 overlay layer (OL), laser engravable, which functions as a protective film—thickness of the overlay layer: 60 µm

674 magnetic stripe mounted to the rear overlay layer (670)

676 laser markings on the protective film (670)

FIG. 7 is an exploded cross-sectional view (not to scale) of a metal transaction card having a top and bottom metal layer encapsulated with thermosetting resin, with a powder coat deposited on the top metal surface coated with a layer of primer to camouflage the presence of a discontinuity in the top metal layer, and with a powder coat deposited on the bottom metal surface coated with a layer of primer to camouflage the presence of a discontinuity in the bottom metal layer.

The construction of the metal transaction card 700 has been briefly described hereinabove, and comprises of the following layers:

700 smartcard (SC) or metal transaction card

710 transponder chip module/inductive coupling chip module (TCM/ICM)

711 module antenna (MA)

776 mechanical engraving and laser etching of graphic elements

723 raised characters (inkjet printed hard ink) or graphic features—post lamination varnish (PLV)

728A thermoset powder coating 727A deposited acrylic clear powder (primer)

730 top or front metal layer (ML, TML, FML), which may be a front face discontinuous metal layer (D-L) with a laser-cut module opening (MO: 712) with metal edges (713) and a slit (720A)—thickness of the top metal layer: 304 µm stainless steel (12 mils)

712 laser-cut module opening (MO: P$_1$)

713 metal edges around the laser-cut module opening (MO: 712)

720A slit in the top metal layer/front face discontinuous metal layer (DML: 730)

738 inter-coat (an adhesion promoter in the form of a primer or an adhesive coating) applied to the rear side surface of the top metal layer/front face discontinuous metal layer (DML: 730)—thickness of the inter-coat: 10 µm 768A a layer of transparent thermosetting resin (polyurethane) encapsulating the rear side of the top metal layer/front face discontinuous metal layer (DML: 730) filling the laser-cut module opening (MO: 712) and the slit (S: 720A) with resin—thickness of the thermosetting resin: 40 µm

743 adhesive layer (AL), a thermosetting adhesive film layer (AL) joining by way of press lamination the top metal layer subassembly to the bottom metal layer subassembly, an inter-coat layer (10 µm) may replace the adhesive layer (25 µm)—thickness of the adhesive layer (AL): 25 µm

750 bottom or rear metal layer (ML, BML, RML), which may be a supporting discontinuous metal layer (DML) with a laser-cut module opening (MO: 714) and a slit (S: 720B)—thickness of the bottom metal layer: 304 µm stainless steel (12 mils)

714 laser-cut module opening (MO: P$_2$)

716 metal edges around the laser-cut module opening (MO: 714)

720B slit in the rear discontinuous metal layer (DML: 750)

748 inter-coat (an adhesion promoter in the form of a primer or an adhesive coating) applied to the rear surface (face-up side) of the bottom metal layer/supporting discontinuous metal layer (DML: 750)—thickness of the inter-coat: 10 µm 768B a layer of thermosetting resin encapsulating the rear side surface of the bottom metal layer/supporting discontinuous metal layer (DML: 750) filling the laser-cut module opening (MO: 714) and the slit (S: 720) with resin—thickness of the thermosetting resin: 40 µm 727B deposited acrylic clear powder (primer) for digital ink 728B thermoset powder coating

774 magnetic stripe mounted to a machined recess in the powder coating (728B)

776 laser marking of the powder coating (728B)

In their various embodiments, the invention(s) described herein may relate to payment smartcards (metal, plastic or a combination thereof), electronic credentials, identity cards, loyalty cards, access control cards, and the like.

FIG. 8 is an exploded cross-sectional view (not to scale) of a metal transaction card having a top and bottom metal layer, with a thermosetting resin coat deposited on the top metal surface coated with a layer of primer to camouflage the presence of a discontinuity in the top metal layer, and with a thermosetting resin coat deposited on the bottom metal surface coated with a layer of primer to camouflage the presence of a discontinuity in the bottom metal layer. Notably, the dual interface chip module (6 or 8 pin contact interface) with a module antenna, inductively couples with the rear discontinuous metal layer. The weight of the card is 24 grams and can be increased by reducing the thickness of the adhesive layer (AL) and increasing the thickness of the metal layer.

The construction of the metal transaction card 800 has been briefly described hereinabove, and comprises of the following layers:

800 smartcard (SC) or metal transaction card

810 dual interface chip module (6 or 8 pin) transponder chip module/inductive coupling chip module (TCM/ICM), embedded in the (cured) thermosetting resin coat 828A (not shown)

811 module antenna (MA)—(not shown)

876A mechanical engraving and laser etching of graphic elements

823 raised characters (inkjet-printed hard ink) or graphic features—post lamination varnish (PLV)

828A thermosetting resin coat (transparent or pigmented) such as polyurethane encapsulating the front side of the top metal layer/front face discontinuous metal layer (DML: 830) filling the laser-cut module opening (MO:

812) and the slit (S: 820A) with resin—thickness of the thermosetting resin: 40 μm

827A inter-coat (an adhesion promoter in the form of a primer or an adhesive coating) applied to the front side surface of the top metal layer/front face discontinuous metal layer (DML: 830)—thickness of the inter-coat: 10 μm

830 top or front metal layer (ML, TML, FML), which may be a front face discontinuous metal layer (DML) with a laser-cut module opening (MO: 812) with metal edges (813) and a slit (820A)—thickness of the top metal layer: 304 μm stainless steel (12 mils)

812 laser-cut module opening (MO: P1)

813 metal edges around the laser-cut module opening (MO: 812)

820A slit in the top metal layer/front face discontinuous metal layer (DML: 830)

843 adhesive layer (AL), a thermosetting adhesive film layer (AL) or a double-side thermosetting film on a dielectric layer such as PET or PEN, joining by way of press lamination the top metal layer (DML: 830) to the bottom metal layer (DML: 850), an inter-coat layer and a thermosetting resin coat may replace the adhesive layer—thickness of the adhesive layer (AL): 75 μm

850 bottom or rear metal layer (ML, BML, RML), which may be a supporting discontinuous metal layer (DML) with a laser-cut module opening (MO: 814) and a slit (S: 820B)—thickness of the bottom metal layer: 304 μm stainless steel (12 mils)

814 laser-cut module opening (MO: P2)

816 metal edges around the laser-cut module opening (MO: 814)

820B slit in the rear discontinuous metal layer (DML: 850)

827B inter-coat (an adhesion promoter in the form of a primer or an adhesive coating) applied to the front of the bottom metal layer/supporting discontinuous metal layer (DML: 850)—thickness of the inter-coat: 10 μm

828B thermosetting resin coat (transparent or pigmented) encapsulating the front side surface of the bottom metal layer/supporting discontinuous metal layer (DML: 850) filling the laser-cut module opening (MO: 814) and the slit (S: 820B) with resin—thickness of the thermosetting resin: 40 μm

874 magnetic stripe mounted to a machined recess in the thermosetting resin coat (828B)

876B laser marking of the thermosetting resin coat (828B)

The top and bottom coat of thermosetting resin in the cured form may be coated with an adhesion promoter to facilitate digital printing of ink to its surface.

While the invention(s) may have been described with respect to a limited number of embodiments, these should not be construed as limitations on the scope of the invention(s), but rather as examples of some of the embodiments of the invention(s). Those skilled in the art may envision other possible variations, modifications, and implementations that are also within the scope of the invention(s), and claims, based on the disclosure(s) set forth herein.

What is claimed is:

1. A method of manufacturing a smartcard (SC) having at least contactless capability, comprising:
providing a first metal layer (ML) having a front side, a rear side, a module opening (MO) and a slit (S); and
coating the rear side of the first metal layer and filling the module opening and slit with a thermosetting resin (TR); and
prior to coating the rear side of the first metal layer, disposing a sacrificial layer on the front side of the metal layer, the sacrificial layer is selected from the group consisting of polytetrafluoroethylene (PTFE, Teflon®), polyolefin backing film, a protective release film with low tack adhesive, polyethylene film tape and plasticized PVC film.

2. The method of claim 1, wherein:
the thermosetting resin comprises polyurethane (PU).

3. The method of claim 1, wherein:
the first metal layer forms a front face metal layer (FML) of the card.

4. The method of claim 1, further comprising:
providing a discontinuous second metal layer (ML, DML, RML) having a front side, a rear side, a module opening (MO) and a slit (S), wherein the second metal layer is disposed below the first metal layer; and
encapsulating the second metal layer with a thermosetting resin to mechanically support the first metal layer.

5. The method of claim 4, further comprising:
providing an adhesive layer (AL) or an inter-coat layer between the encapsulated first metal layer and the encapsulated second metal layer; and
joining the second metal layer to the first metal layer by way of press lamination.

6. The method of claim 4, further comprising:
applying a primer to the rear side of the second metal layer; and
after applying the primer to the rear side of the second metal layer, applying a decorative coating of ink or thermoset powder to cover the rear surface of the second metal layer and camouflage the slit.

7. The method of claim 4, further comprising:
milling out cavities in the thermosetting resins in the module openings in the first and second metal layers for accepting insertion of a transponder chip module in the cavities; and inserting the transponder chip module into the milled out openings.

8. A method of manufacturing a smartcard (SC) having at least contactless capability, comprising:
providing a first metal layer (ML) having a front side, a rear side, a module opening (MO) and a slit (S); and
coating the rear side of the first metal layer and filling the module opening and slit with a thermosetting resin (TR);
prior to coating the rear side of the first metal layer, disposing a sacrificial layer on the front side of the metal layer; and
after coating the rear side of the first metal layer, and the thermosetting resin is sufficiently cured to remain in the module opening, removing the sacrificial layer and applying a primer to the front side of the first metal layer; and
after applying the primer to the front side of the first metal layer, applying a decorative coating of ink or thermoset powder to cover the front surface of the first metal layer and camouflage the slit.

9. The method of claim 8, further comprising:
before applying the decorative coating, allowing the primer to dry.

10. The method of claim 8, further comprising:
after applying the decorative coating, forming raised characters or graphic features on the decorative coating.

11. The method of claim 8, further comprising:
after applying the decorative coating, engraving the decorative coating.

12. The method of claim 11, wherein:
the process of engraving is performed before or after forming the raised characters or graphic features.

13. The method of claim 11, wherein:
the process of engraving is selected from the group consisting of mechanical or laser engraving.

* * * * *